US009883173B2

(12) United States Patent
Woods

(10) Patent No.: US 9,883,173 B2
(45) Date of Patent: Jan. 30, 2018

(54) STEREOSCOPIC DISPLAY

(71) Applicant: 3DI LLC, Alexandria, VA (US)

(72) Inventor: David Paul Woods, Burke, VA (US)

(73) Assignee: 3DI LLC, Alexandria, VA (US)

(*) Notice: Subject to any disclaimer, the term of this patent is extended or adjusted under 35 U.S.C. 154(b) by 236 days.

(21) Appl. No.: 14/547,555

(22) Filed: Nov. 19, 2014

(65) Prior Publication Data

US 2015/0124065 A1    May 7, 2015

Related U.S. Application Data

(60) Provisional application No. 61/920,755, filed on Dec. 25, 2013, provisional application No. 61/934,806, (Continued)

(51) Int. Cl.
*H04N 13/04* (2006.01)
*H04N 13/00* (2006.01)

(52) U.S. Cl.
CPC ..... *H04N 13/0431* (2013.01); *H04N 13/0014* (2013.01); *H04N 13/0438* (2013.01); *H04N 13/0477* (2013.01); *H04N 13/0479* (2013.01)

(58) Field of Classification Search
CPC .................................................. H04N 13/0014
(Continued)

(56) References Cited

U.S. PATENT DOCUMENTS 6,064,354 A    5/2000  Deluca
6,304,286 B1  10/2001  Shirai
(Continued)

FOREIGN PATENT DOCUMENTS

EP         2528337 A1    12/2012
WO    WO-2010134411    11/2010
WO    WO-2012044272     4/2012

OTHER PUBLICATIONS

Author: Wikipedia Title: "Parallax Barrier" https://en.wikipedia.org/wiki/Parallax_barrier Retrieved Aug. 29, 2017.
(Continued)

*Primary Examiner* — Hung Dang
*Assistant Examiner* — Girumsew Wendmagegn
(74) *Attorney, Agent, or Firm* — ARC IP Law, PC; Joseph J. Mayo

(57)    ABSTRACT

A stereoscopic display method or system includes an image display panel, object tracking sensors, and a means to create first or left, and second or right stereoscopic images based upon viewpoint location. This allows the user to perceive the viewed 3D stereoscopic image as approximately fixed in space.
A first embodiment employs differently filtered colored, stereoscopic images. The first and second differently filtered colored images may be perceived as a 3D stereoscopic image by applying anaglyph glasses.
In a second embodiment the method of passively polarized glasses may be applied with the result being a stereoscopic image whose location is approximately fixed in space.
A third embodiment employs passively polarized anaglyph glasses. This provides the advantage of allowing two different viewers to see different virtual 3D stereoscopic images whose location remains approximately fixed in space.
By employing tracking sensors, user gesturing or pointing may now allow interaction with the virtual 3D stereoscopic images in much the same way 2D objects are manipulated by employing a touch screen. This may be combined with voice commands. This allows for input systems such as virtual 3D touch panels, keyboards and remote controllers. In addition virtual 3D objects may be pushed, pulled rotated or manipulated in almost any way a real 3D object would be.

(Continued)

The methods described may be applied in other ways, including, but not limited to gaming systems, 3D virtual caves, and simulators. It may also be used wired or wirelessly to remotely control or interact with other devices.

7 Claims, 23 Drawing Sheets

Related U.S. Application Data filed on Feb. 2, 2014, provisional application No. 62/035,477, filed on Aug. 10, 2014.

(58) Field of Classification Search
USPC .......................................................... 348/60
See application file for complete search history.

(56) References Cited

U.S. PATENT DOCUMENTS

| | | |
|---|---|---|
| 6,633,655 B1 | 10/2003 | Hong |
| 8,330,881 B2 | 12/2012 | Krijin et al. |
| 8,482,511 B2 | 7/2013 | Goris et al. |
| 8,717,360 B2 | 5/2014 | Vesely |
| 8,717,423 B2 | 5/2014 | Vesely |
| 8,942,427 B2 | 1/2015 | Lee |
| 9,355,488 B2 | 5/2016 | Goris et al. |
| 9,380,295 B2 | 6/2016 | Dolim |
| 2007/0252832 A1 | 11/2007 | Ratai |
| 2008/0297593 A1 | 12/2008 | Debevec |
| 2010/0007582 A1* | 1/2010 | Zalewski ............... A63F 13/00 345/8 |
| 2010/0103516 A1 | 4/2010 | McKnight |
| 2010/0149182 A1 | 6/2010 | Butler |
| 2011/0128555 A1 | 6/2011 | Rotschild |
| 2011/0157264 A1 | 6/2011 | Seshadri |
| 2012/0038635 A1 | 2/2012 | Stamate |
| 2012/0120060 A1 | 5/2012 | Noda |
| 2012/0162214 A1 | 6/2012 | Chavez |
| 2012/0313930 A1 | 12/2012 | Yun |
| 2013/0128011 A1 | 5/2013 | Chavez |
| 2014/0184588 A1 | 7/2014 | Cheng |
| 2014/0240338 A1 | 8/2014 | Patino |
| 2014/0313295 A1* | 10/2014 | Dolim ..................... G06F 3/01 348/51 |
| 2014/0320614 A1 | 10/2014 | Gaudreau |
| 2015/0124063 A1 | 5/2015 | Woods |
| 2015/0143976 A1 | 5/2015 | Katto |
| 2015/0161476 A1 | 6/2015 | Kurz |
| 2016/0182877 A1 | 6/2016 | Deluca |
| 2016/0293113 A1 | 10/2016 | Yoo |

OTHER PUBLICATIONS

Author: Wikipedia Title: "Light field Camera" https://en.wikipedia.org/wiki/Light-field_camera Retrieved Aug. 29, 2017.
Author: Wikipedia Title: Autostereoscopy https://en.wikipedia.org/wiki/Autostereoscopy Retrieved Aug. 29, 2017.
Author: Chavez et al. Title: "TECH SPECS zSpace for Education" https://cdn.zspace.com/collateral/brochures/zSpace300TechSpecs_081816.pdf Retrieved Aug. 29, 2017.
Authors: Li, Jiang, et al. Aug. 29, 2017 "Depth-VR: 3D world jumping out of your screen" https://www.kickstarter.com/projects/ncf/depth-vr-3d-world-jumping-out-of-your-screen.

* cited by examiner

STEREOSCOPIC DISPLAY

CROSS REFERENCE TO PRIORITY APPLICATION

This application claims the priority benefit of U.S. Provisional Patent Application Ser. No. 61/920,755, filed on Dec. 25, 2013, Ser. No. 61/934,806, filed on Feb. 25, 2014, and Ser. No. 62/035,477, filed on Aug. 10, 2014, the subject matter for which is incorporated herein by reference.

BACKGROUND OF THE INVENTION

1. Field of the Invention

The instant invention relates to a stereo image display technique, by which a 3D image display may produce a stereoscopic image that takes viewpoint into account. By taking viewpoint into account, a stereoscopic image may be created which appears to remain at approximately the same location in space as viewpoint changes.

2. Description of Related Art

Methods of implementing a 3D stereoscopic image are described as follows:

First of all, as mentioned in the following description, in order to implement a 3D stereoscopic image, a first image for a left eye and a second image for a right eye need to arrive at both eyes in a manner of being discriminated from each other. For this, various methods are explained as follows. These images shall be referred to as first or left image and second or right image.

Prior art displays which may be viewed as 3D images generally fall into four methods for display of 3D imagery.

The first method employs polarized light images where the planes for first and second images are rotated by approximately 90 degrees. A similar method employs first and second circularly or elliptically polarized images. These polarized first and second images pass through polarized spectacles so that the corresponding image reaches the first or left and second or right eye.

Another similar method employs liquid crystal shutter spectacles which open and close left and right shutters so as to allow the corresponding image to reach the correct eye. Prior art employing liquid crystal shutters do not account for a change in viewing location from one viewer to the next. Therefore a 3D image would appear to be at different locations in space when viewed from differing viewpoints. Thus if one viewer pointed at a 3D stereoscopic object, a viewer at a second viewing location would have difficulty determining what is being pointed at.

A third method employs a lenticular screen provided between a display and both eyes. In particular, a propagating direction of light is refracted via lens on the lenticular screen, whereby different images arrive at both eyes, respectively.

A fourth method requires no spectacles and utilizes parallax barriers so that each eye sees the proper image. This technology shall be referred to as auto stereoscopic.

A final method employs differently colored filtered images, which are viewed through glasses whose lenses are colored differently. This method or system shall be referred to as anaglyphic or an anaglyph.

SUMMARY OF THE INVENTION

The instant invention employs a 3D stereoscopic method combined with position tracking technology to produce a 3D stereoscopic image which remains in approximately the same location in space even when viewed from various perspectives. This provides a 3D image which appears to be in approximately the same location despite the viewing location. The viewer may move towards or away, up or down, left or right yet the image remains in approximately the same location in space. It moves very little as the viewpoint changes. However, the 3D stereoscopic image will change to reflect how the viewer would see the 3D objects in the image from different perspectives. This 3D stereoscopic image that remains approximately fixed in spatial location may also be referred to as a virtually real image, virtual real image or virtual image. Position tracking or position sensing shall be used interchangeably and mean the same thing in this document.

The sensors on the display in combination with a computing device may detect when an external object or pointer is in close proximity to the virtual location of a 3D stereographic object whose position is stabilized in space. Thus stabilized, it becomes possible for viewers to interact with the 3D stereoscopic image. Prior art employing gestures or voice is limited in scope and does not allow the user to manipulate and interact with a stereoscopic 3D virtual image. This shall be further elucidated in the description of the instant invention.

To accomplish this goal, the perspective position of the viewpoint must be sensed and measured. In this document position tracking and position sensing shall be understood to mean the same thing. From this information an image is created which is what an observer located at this position would see if the real object were present. This viewpoint is what one would expect to see if viewed in a monocular fashion (i.e. from one eye with the other closed). Therefore, for each viewing location (or eye location) a new image must be created. So the sensor must be able to calculate the position of each eye or lens of the viewer(s). The created images should take into account both the angular position of the viewpoint and the distance. The viewing angle and distance shall be referred to as viewing perspective, or viewpoint.

In the instant invention, the viewer is able to interact with the stabilized virtual image. This enables many applications. Input devices such as keyboards, remote controllers, musical instruments, virtual caves, virtual simulators and interactive 3D gaming systems are a few such applications, however the instant invention is not meant to be limited to these systems or devices. Some of these systems or devices will be further described in the following detailed description. Prior art that utilizes gestures to interact with a 2D image display are common. However these do not allow interaction with a 3D virtual image.

Prior art in exists which images are created based on viewpoint perspective in real time 2D displays. Many video games at this time employ said technology. The image may be completely computer generated or interpolated from photographic images taken from various perspectives. This same technology may be adapted to create stereographic pairs of images, which when viewed by the stereographic methods of the instant invention may produce the desired stabilized 3D image.

In addition, current motion picture creation employs sensors which track location of body parts that are then used to create images. Such sensing technology could be used to track the eyes or lenses of glasses. Some location sensing methods employ small round objects that emit light, while others do not. These sensors may also be used to track the location of pointers, or body parts. They may also be used to track wearable devices to include, but not be limited to gloves, glasses, and hats. By tracking these wearable objects or by tracking body parts the viewpoint may be calculated or inferred. Wearable devices may or may not include objects or markers, which may emit or reflect light to the sensors. Pulses, frequency or other method to enable sensors to differentiate location may code the emitted or reflected light. The light may be visible, infrared, or of other frequencies. Other position sensing technologies that employ magnetism, accelerometers, or gravitation sensing may be employed to improve tracking of objects with the intent of improvement of speed and accuracy.

Finally, the correct image must reach the correct lens or eye. One of several methods is used to achieve this.

In the first embodiment anaglyph glasses are employed. The left or first image is color coordinated to pass through the left or first lens of the anaglyph glasses. The right or second image is color coordinated to pass through the right or second lens of the anaglyph glasses. In this way the viewer may see a 3D stereographic image.

In a second embodiment passively polarized glasses are employed. The left or first image has polarization coordinated to pass through the left or first lens of the passively polarized glasses. The second or right image has polarization coordinated to pass through the right or second lens of the passively polarized glasses. In this way the viewer may see a 3D stereographic image. Another embodiment employs a combination of anaglyph and passively polarized glasses.

The instant invention may also display 3D stereographic images in the manner of prior art whereby the first and second image do not use information from the sensors to vary the image based on viewpoint location. This method shall be referred to as prior art 3D.

This method may be employed for viewing medium such as movies or games which have been created for prior art 3D.

Furthermore, the instant invention enables switching between 2D and 3D modes. In 2D mode multiple viewers may view multiple images. So two or more viewers may use the display to watch different things.

Also, the display of the instant invention may be presented in portrait or landscape mode. The landscape or portrait mode may be manually or automatically changed by means of an orientation sensor of various types. So a tablet, phone, or other handheld device may use the display of this invention.

To sum up the process, method, or system, of creating and viewing the virtual image is as follows:
1. A left or first viewing perspective is sensed and location quantified in space.
2. A left or first image is created corresponding to what would be seen by a viewer with said left or first perspective.
3. The left or first image is displayed in conjunction with technology, which limits the viewing to the left or first perspective. This may be accomplished via anaglyph glasses, passively polarized, or a combination of anaglyph and passively polarized glasses.
4. A right or second viewing perspective is sensed and location quantified in space.
5. A right or second image is created corresponding to what would be seen by a viewer with said right or second perspective.
6. The right or second image is displayed in conjunction with technology, which limits the viewing to the right or second perspective. This may be accomplished via anaglyph glasses, passively polarized glasses, or a combination of anaglyph and passively polarized glasses.
7. The process is repeated for each viewer in sequence in a continuous loop. However, the sequence may vary in order so long as the image is coordinated with the stereoscopic method so that the correct image reaches the intended eye.

In this manner a 3D stereoscopic image may be seen whose location remains approximately fixed in space when viewed from different perspectives. The display may be a liquid crystal display device, an electroluminescent display device, an organic light emitting display device, a plasma display device, or a projected display image. However, this list of display types is for illustrative purposes only and is not intended to be limiting in any way.

There are many ways of accomplishing this end. There are endless variations of placement of parts, methods of generating image patterns, different ordering of parts, and/or display images which accomplish the same objective. Someone practiced in the art will be able to design and construct many variations, which include but are not limited to those above. Hence the invention is what is in the claims and includes more than the embodiments described below.

DETAILED DESCRIPTION OF THE INVENTION

Figure 1:
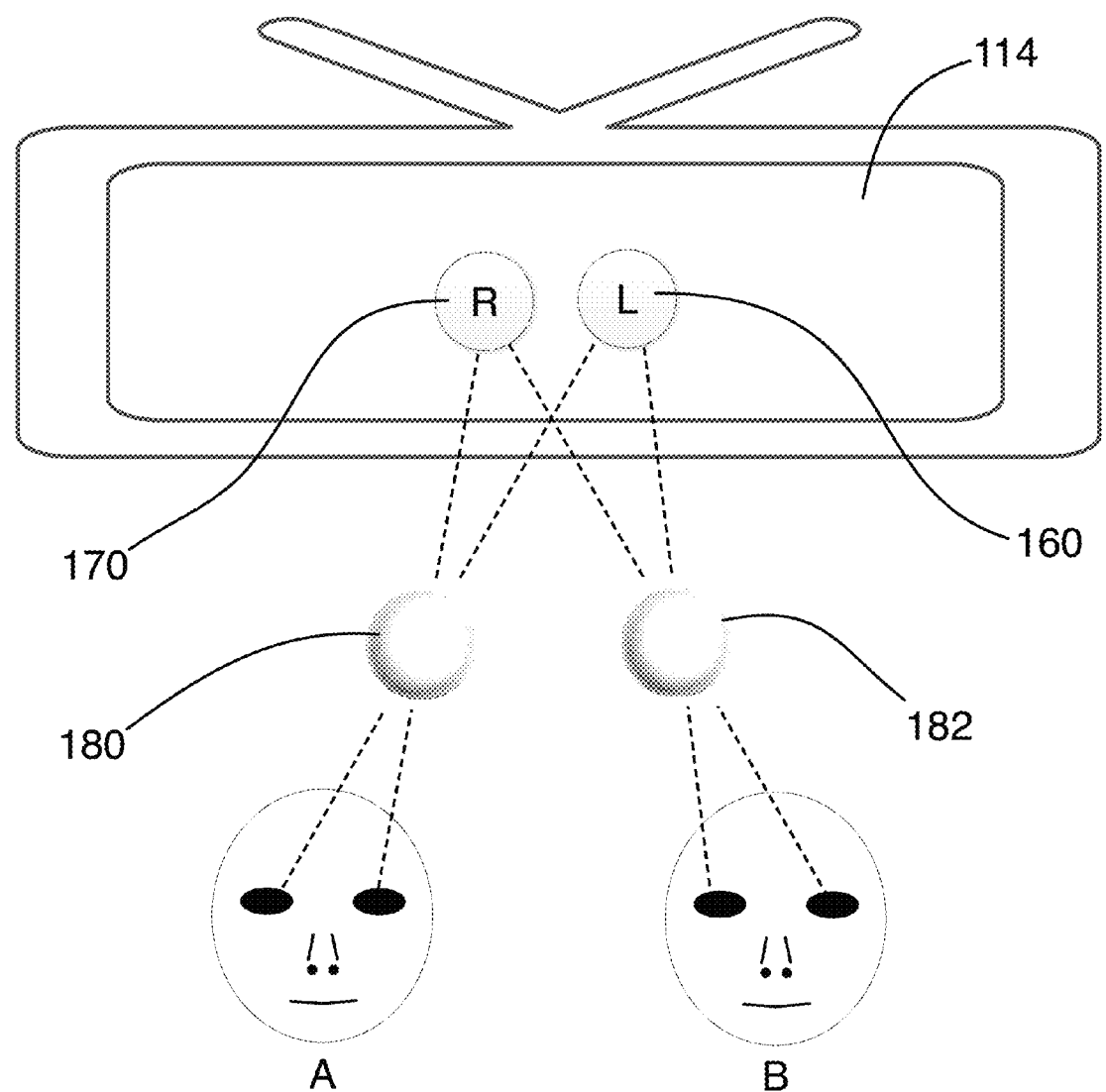
FIG. 1 is a schematic diagram illustrating prior art in which the 3D stereoscopic images virtual location moves as viewpoint shifts.

With reference now to FIG. 1 of the drawings, there is shown an illustration of prior art. A 3D stereoscopic image is presented to viewers positioned at A and B. The left or first image (item 160) as well as the right or second image (item 170) locations is fixed on the image display (item 114) for either viewing from position A or B. The result is 3D image object locations, 180 and 182, which differ in space. Each stereoscopic image tends to be more in front of the viewing position.

Figure 2:
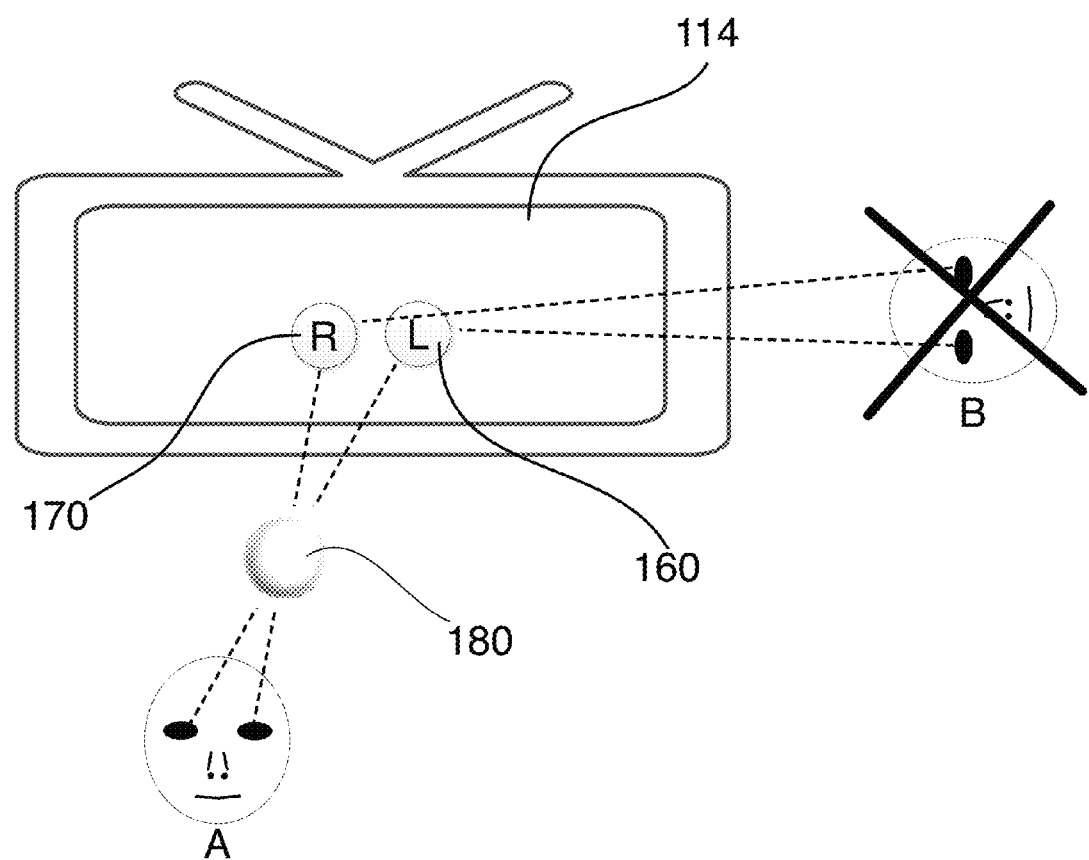
FIG. 2 is a schematic diagram illustrating prior art in which the 3D virtual image is unable to be viewed stereoscopically when the viewer's head is angularly tilted in relation to the display.

With reference now to FIG. 2 of the drawings, there is shown an illustration of prior art. It is apparent that changing viewing angle results in less than optimal 3D image or possibly failure of 3D imaging.

Figure 3:
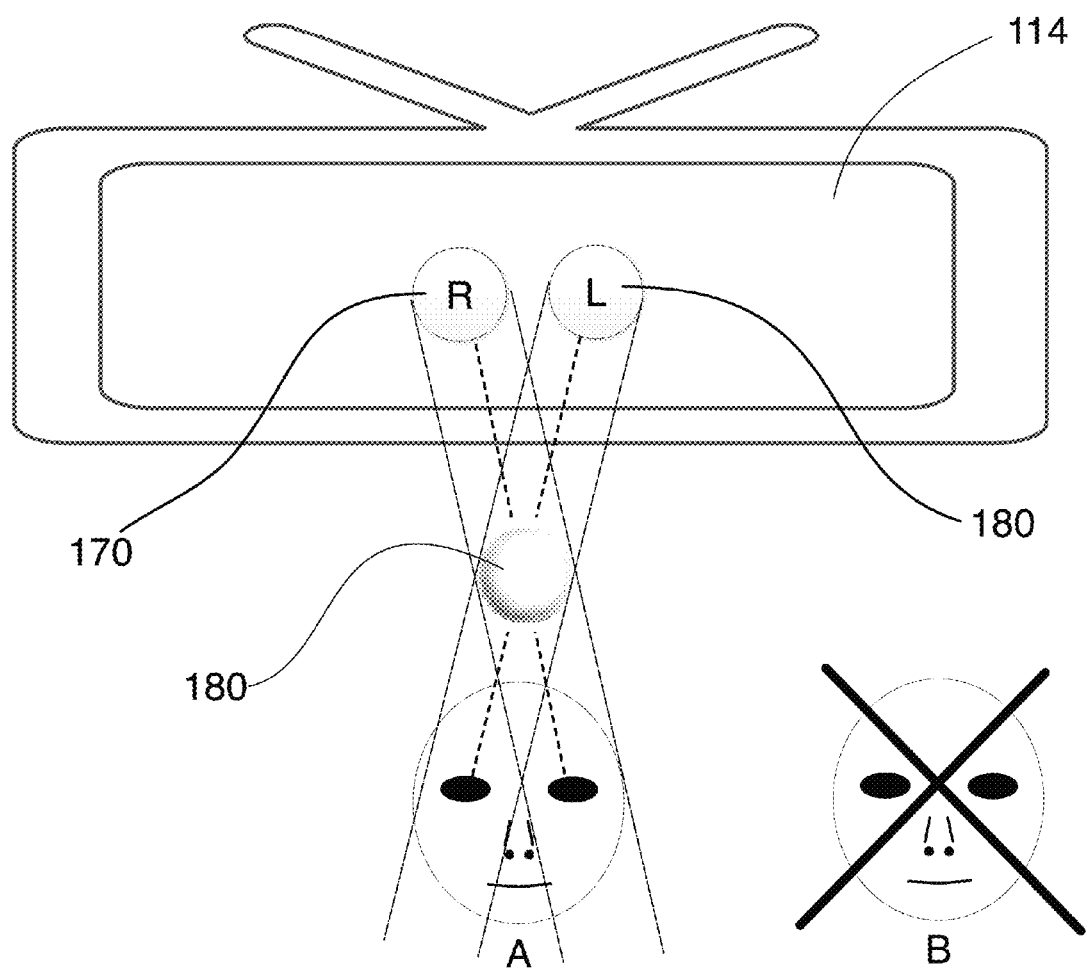
FIG. 3 is a schematic diagram illustrating prior art 3D auto stereoscopic displays, which limit viewing location.

With reference now to FIG. 3 of the drawings, there is shown an illustration of prior art, a 3D stereoscopic device that employs current louvers to aim or guide the light from an image to the viewer's eyes. The limitation is because the louvers are fixed and not configurable based on viewing location. Therefore the viewing location is limited.

Figure 4:
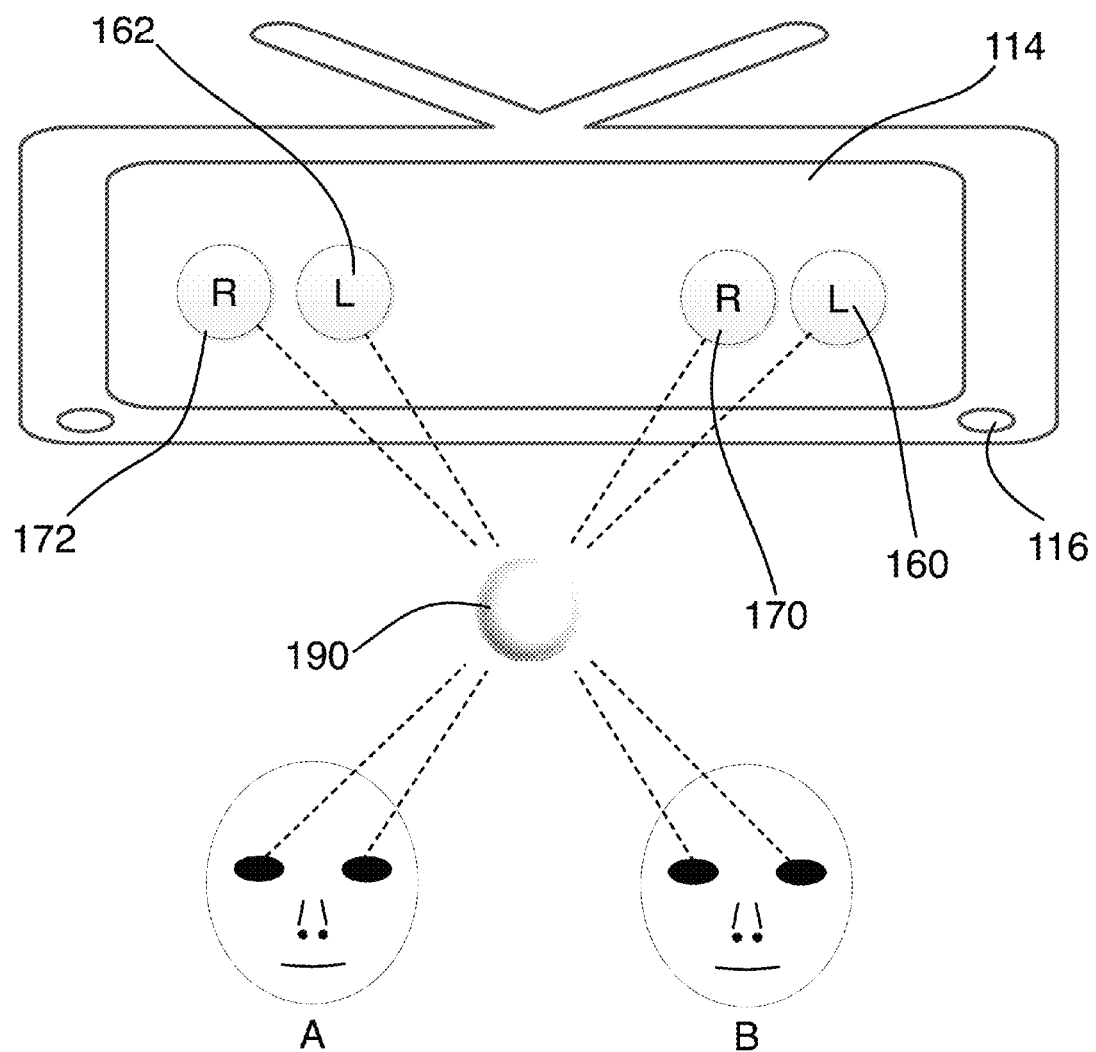
FIG. 4 is a schematic diagram illustrating an embodiment where the 3D stereoscopic image remains fixed in space as viewing location is shifted.

With reference now to FIG. 4 of the drawings, there is shown an illustration of an embodiment of the instant invention. Sensors (item 116) locate the viewpoint perspectives. These sensors may be passive receivers, or may be emissive and receptive of signals, or of other methods to determine viewpoint locations. Based on where the viewpoint perspective is sensed, an image is created corresponding to how the intended image would be seen from that viewpoint. This is an improvement over prior art where viewpoint location was approximately fixed in space for best viewing. The instant art takes viewpoint into consideration when presenting images.

For a viewer located at A, the first or left displayed image (item 160) is now a function of the position of the left or first eye of viewer perspective A. The second or right displayed image (item 170) is now a function of the position of the right or second eye of viewer perspective A.

For a viewer located at B, the first or left displayed image (item 162) is now a function of the position of the left or first eye of viewer perspective B. The second or right displayed image (item 172) is also now a function of the right or second eye of viewer perspective B. As a result, the 3D stereoscopic object image (item 190) is now seen in approximately the same location in space from both viewpoints A and B.

Due to the 3D stereoscopic images location being approximately fixed in space its position in relation to the display may be determined. This may then be compared with the sensed location of a viewer's body part, wearable object, or pointer. In this manner it will be possible for one or more users to interact with the 3D stereographic objects or images.

Figure 5:
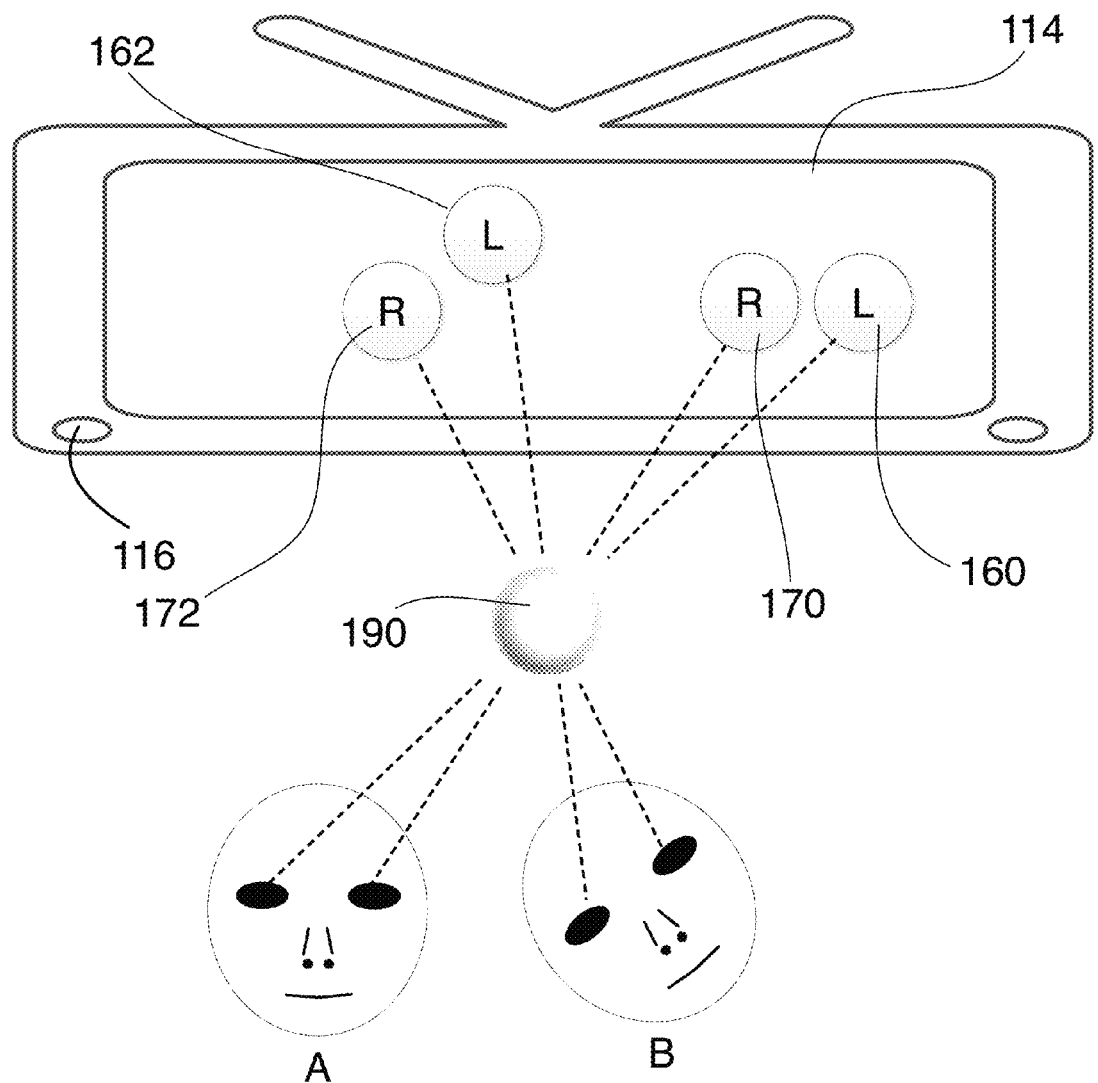
FIG. 5 is a schematic diagram illustrating an embodiment where the 3D stereoscopic image remains fixed and viewable as the viewer's head is angularly tilted in relation to the display.

With reference now to FIG. 5 of the drawings, there is shown an illustration of an embodiment of the instant invention. Sensors or markers (item 116) locate the viewpoint perspectives. These sensors may be passive receivers, or may be emissive and receptive of signals, or of other methods to determine viewpoint locations. Facial or object recognition may be used in lieu of sensors or markers to determine viewpoint locations. Other position sensing technologies that employ magnetism, accelerometers, or gravitation sensing may be employed to improve tracking of objects with the intent of improvement of speed and accuracy. Based on where the viewpoint perspective is sensed, an image is created corresponding to how the intended image would be seen from that viewpoint.

For a viewer located at A, the first or left displayed image (item 160) is a function of the position of the left eye of viewer A. The second or right displayed image (item 170) is a function of the position of the right eye of viewer A.

In this illustration, the viewer located at B has his head tilted in relation to the display (item 114). For the viewer located at B, the first or left displayed image (item 162) is a function of the position of the left eye of viewer located at B. The second or right displayed image (item 172) is a function of the position of the right eye of viewer located at B. As a result, the 3D stereoscopic object image (item 190) is now seen in approximately the same location in space from both viewpoints A and B. The viewer located at B is able to see the 3D stereoscopic image in approximately the same location in space as when the viewer is located at A, even though his head is tilted with respect to the display.

The 3D stereographic images location remains approximately fixed in space. This allows it's fixed position coordinates to be determined. These may then be compared with the sensed location of a viewer's body part, wearable object or pointer. In this manner it becomes possible for one or more users to interact with the 3D stereographic objects or images. Other position sensing or tracking technologies such as magnetic, accelerometers, inertial, or gravitation sensing may be employed with the intent of improvement of speed and accuracy.

Figure 6:
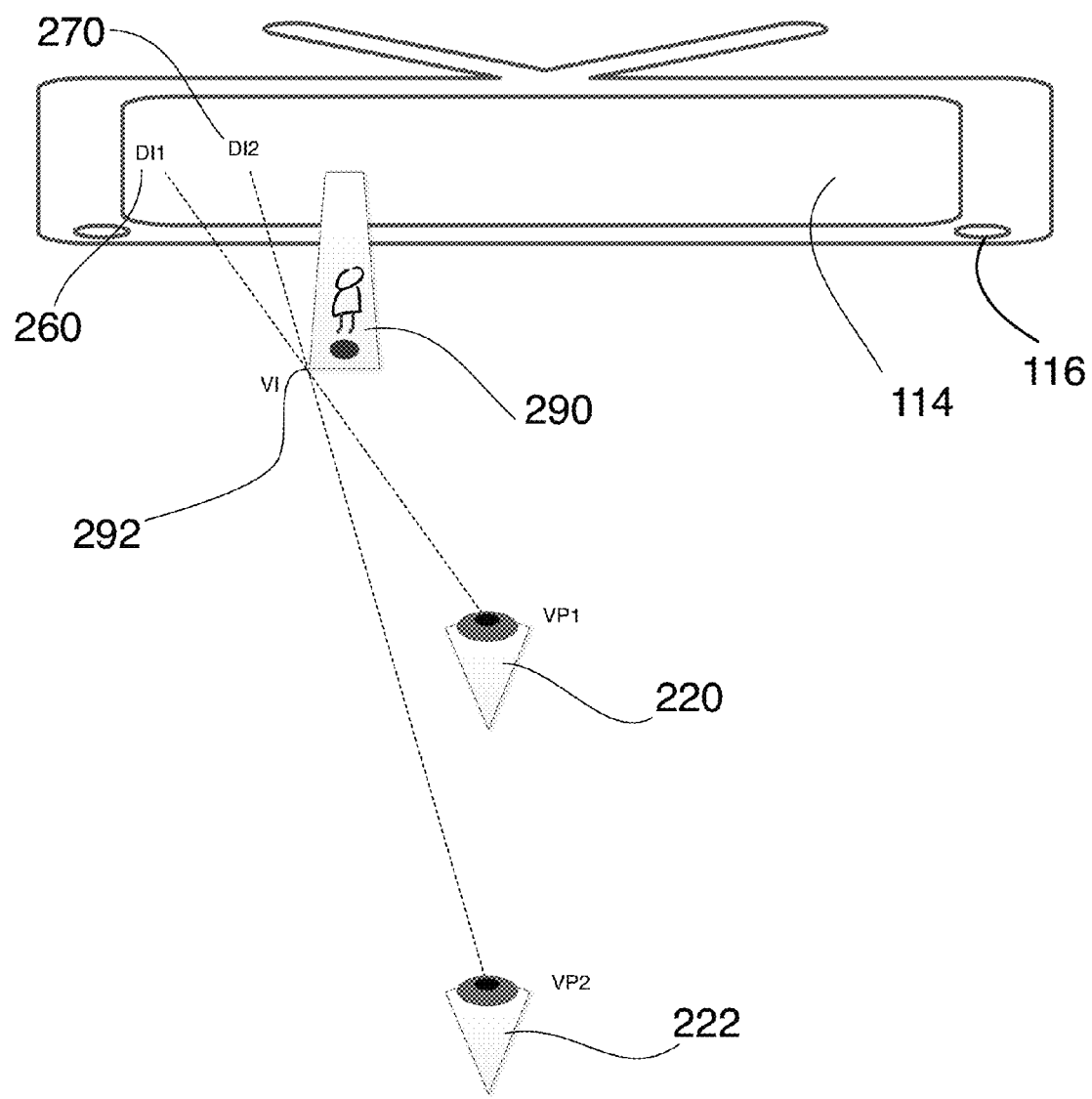
FIG. 6 is a schematic diagram illustrating an embodiment where the 3D stereoscopic image remains fixed in space as the viewing location is moved closer or farther from the display.

With reference now to FIG. 6 of the drawings, there is shown an illustration of an embodiment of the instant invention. This illustrates the fact that in addition to viewing angle, the viewing distance also is measured in order to create the correct display image presentations (items 260 and 270). In this manner both viewpoint 1 (item 220) and 2 (item 222) are able to see the virtual object image (item 292) in approximately the same location in space. Sensors (item 116) locate the viewpoint perspectives. These sensors may be passive receivers, or may be emissive and receptive of signals, or of other methods including but not limited to facial or object recognition to determine viewpoint locations. Based on where the viewpoint perspective is sensed, an image is created corresponding to how the intended image would be seen from that viewpoint.

Figure 7:
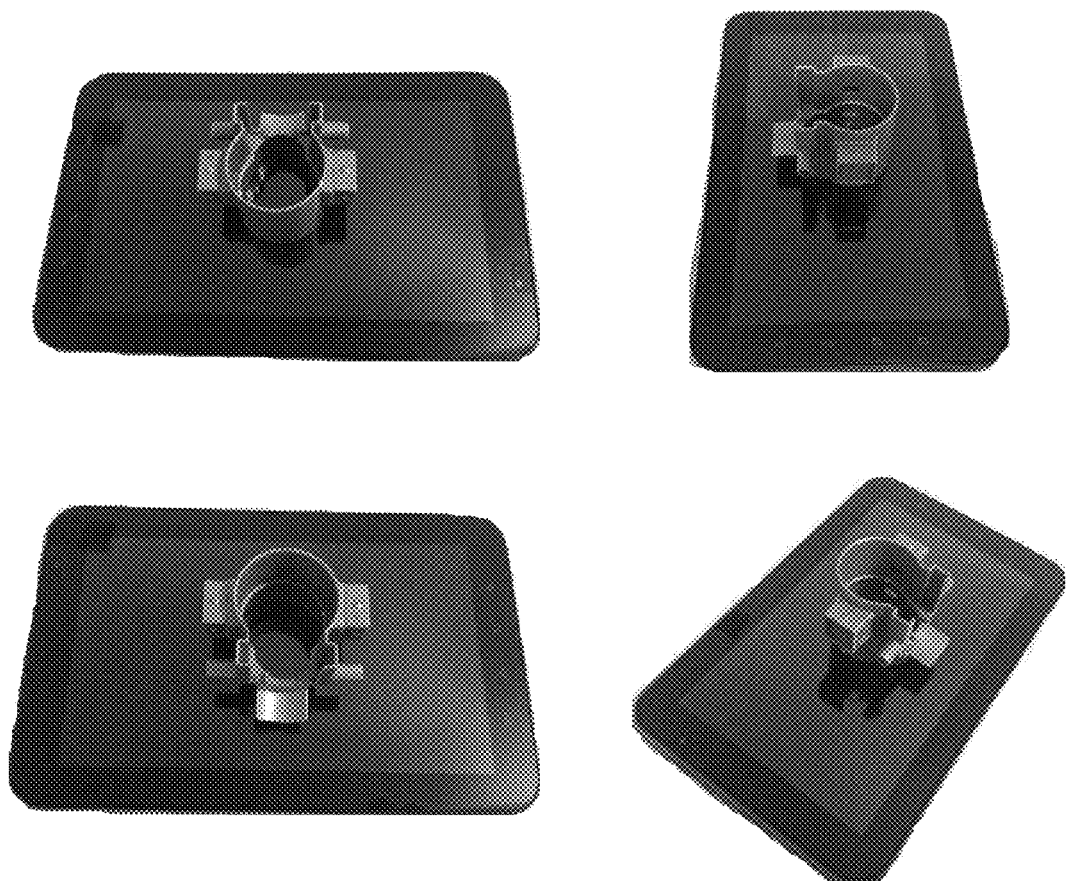
FIG. 7 is a schematic diagram illustrating an embodiment where the 3D virtual object is seen from different viewpoints yet remains fixed in space.

With reference now to FIG. 7 of the drawings, there is shown an illustration of an embodiment of the how an object might appear when viewed from different perspectives within the instant invention.

Figure 8:
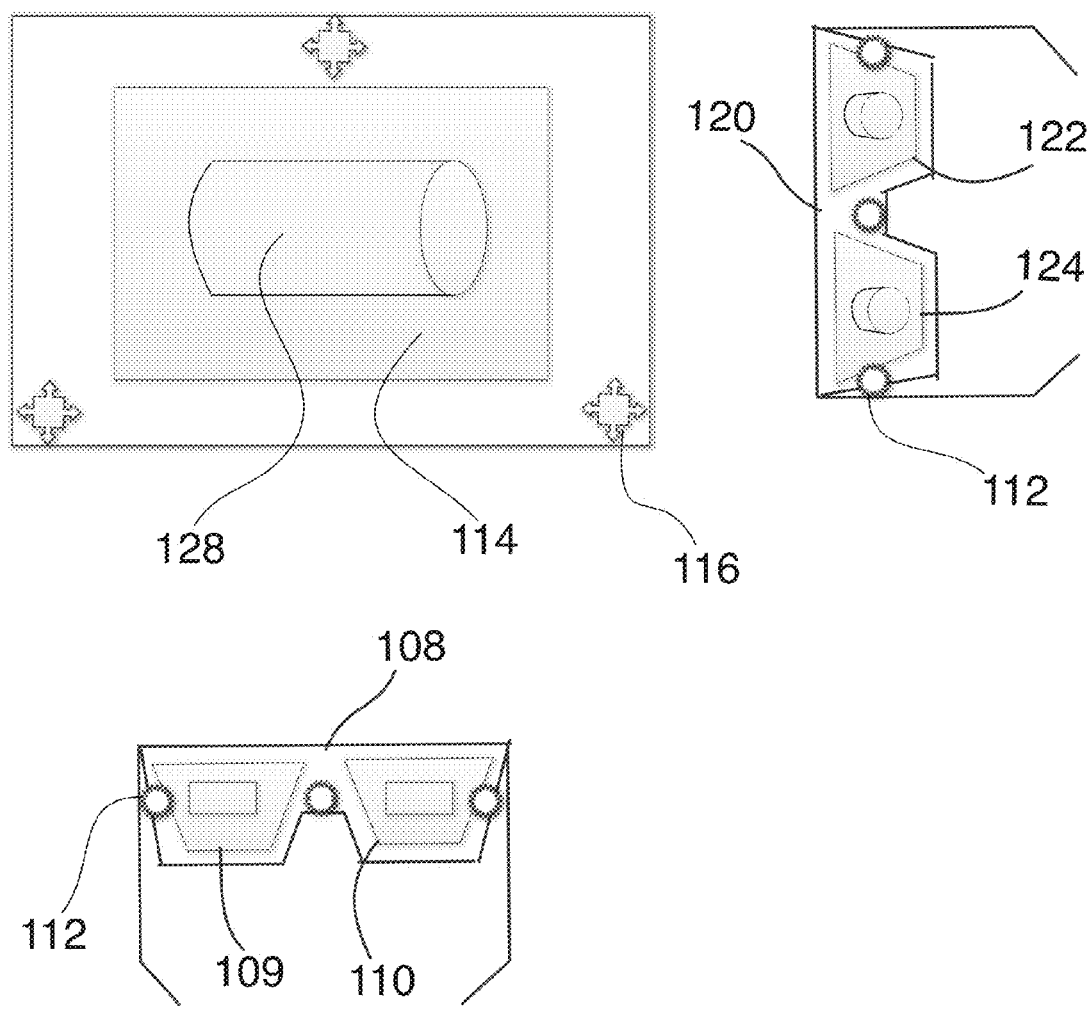
FIG. 8 is a schematic diagram illustrating an embodiment applying viewpoint sensors.

With reference now to FIG. 8 of the drawings, there is shown an illustration of an embodiment of the instant invention applying either anaglyph, passively polarized glasses or passively polarized anaglyph glasses. One or more sets of sensors (item 116) may be used to sense the location of glasses (items 108 and 120) and specifically the lenses (items 109, 110, 122, and 124) of the glasses using position markers (items 112 and 113) located on the glasses.

These markers may emit or reflect light or sound, or may be of the magnetic variety. Alternatively, object or facial recognition technology may be used to sense the position of the lenses. When anaglyph glasses are employed, these object images would be color coordinated with correct optical association to the anaglyph glasses so a 3D image is seen. When passively polarized glasses are employed, these object images would be polarization coordinated with correct optical association to the passively polarized glasses so a 3D image is seen.

By the aforementioned means, an object image (item 128), in this case a cylinder would be presented as different images to perspective viewing locations represented by items 108 and 120. More specifically, each lens of the glasses would pass a unique perspective image to the intended eye. Images passing through lenses 109, 110, 122 and 124 are created based on viewpoint perspective as viewing location differs.

Figure 8A:
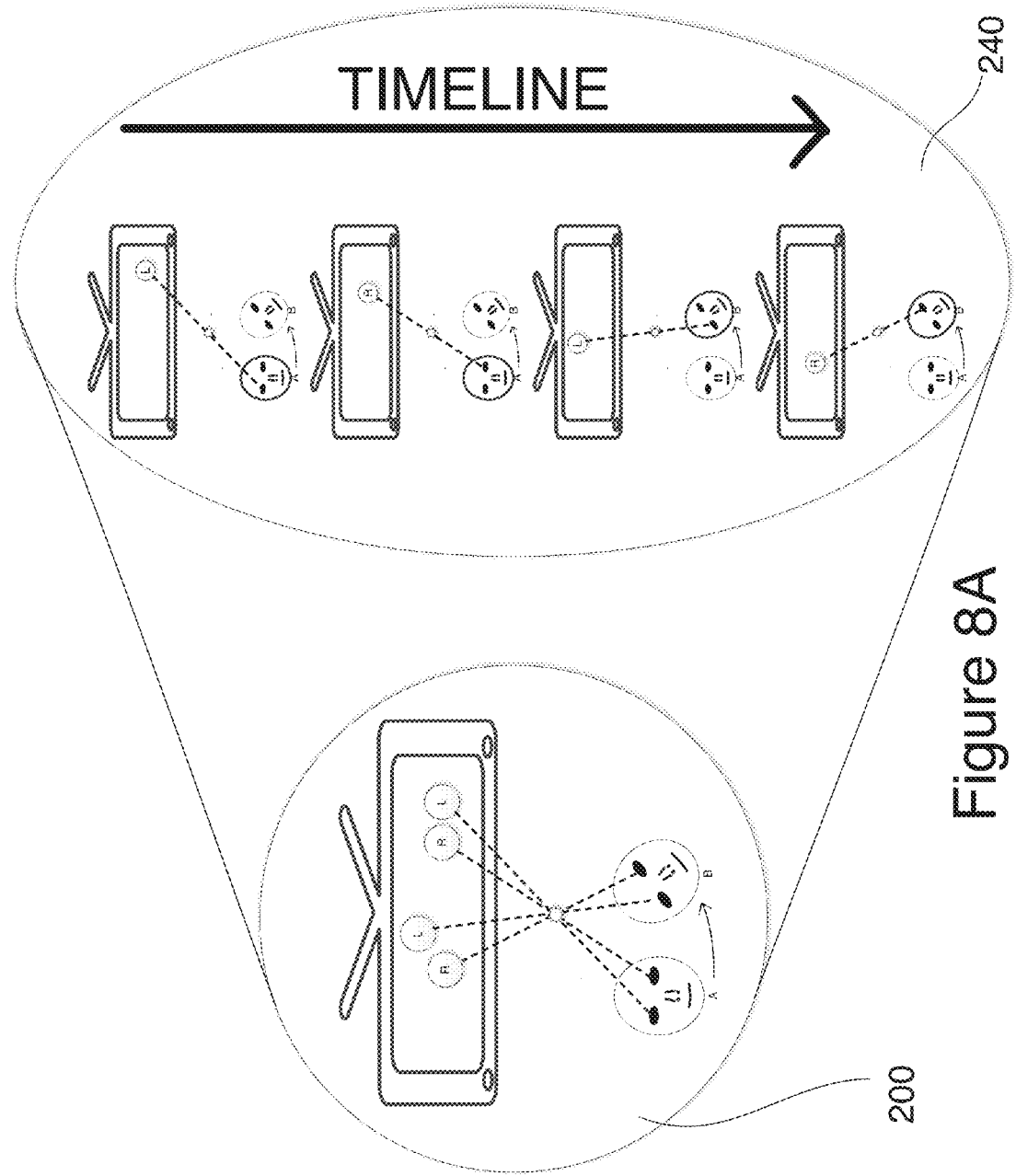
FIG. 8A is a schematic diagram illustrating an embodiment where displayed images may be changed as time progresses.

With reference now to FIG. 8A of the drawings, there is shown an illustration of an embodiment of the instant invention. This illustration shows progression through time. Item 200 shows how as viewing location is changed; the 3D stereoscopic images location remains unchanged in space. Item 240 shows how this is accomplished by enabling each prospective viewpoint to see an image created based on the viewpoints perspective as viewing location differs.

Figure 9:
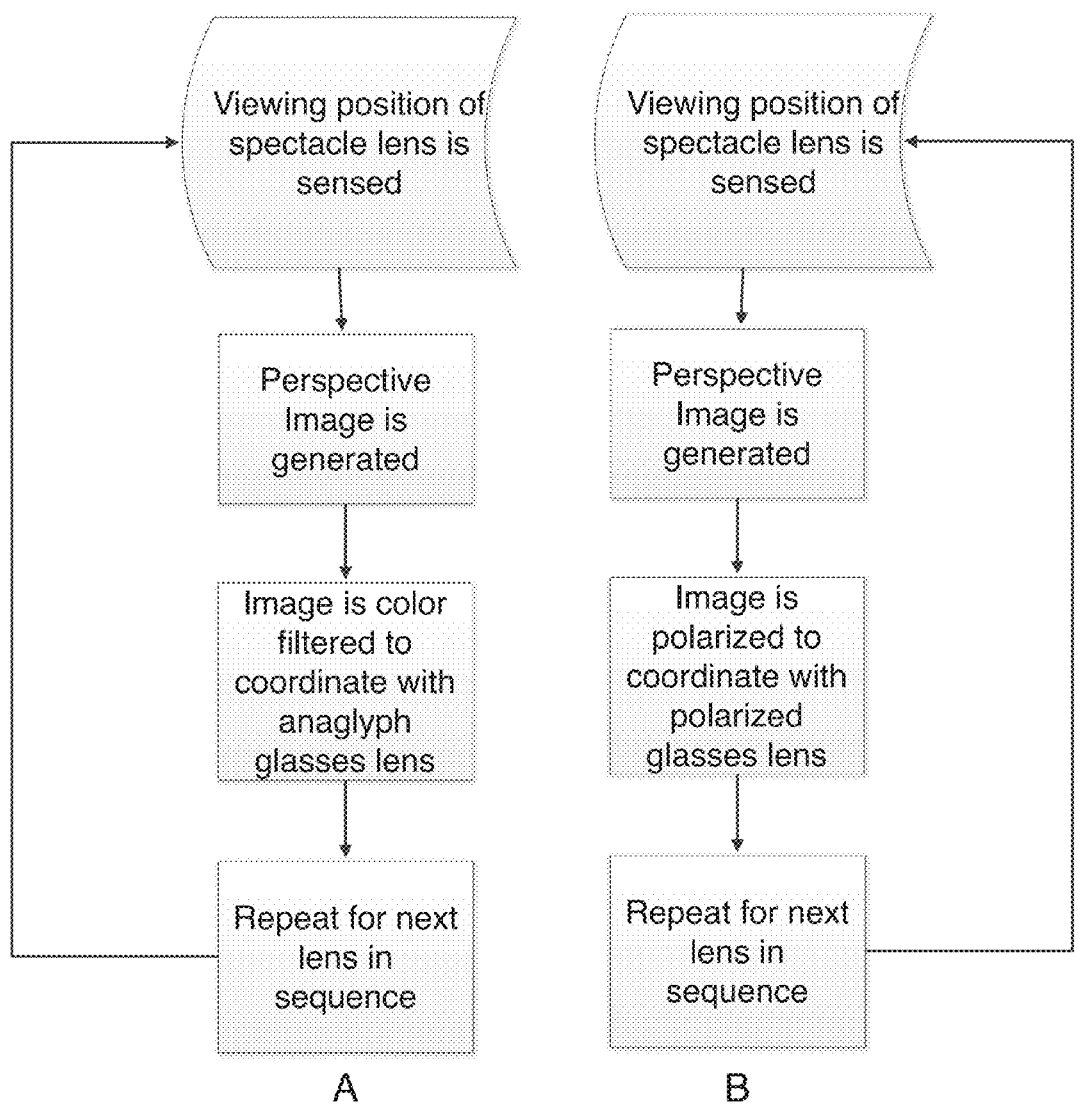
FIG. 9 is a schematic diagram illustrating an embodiment applying viewpoint sensors and either anaglyph glasses or passively polarized glasses.
Figure 9A:
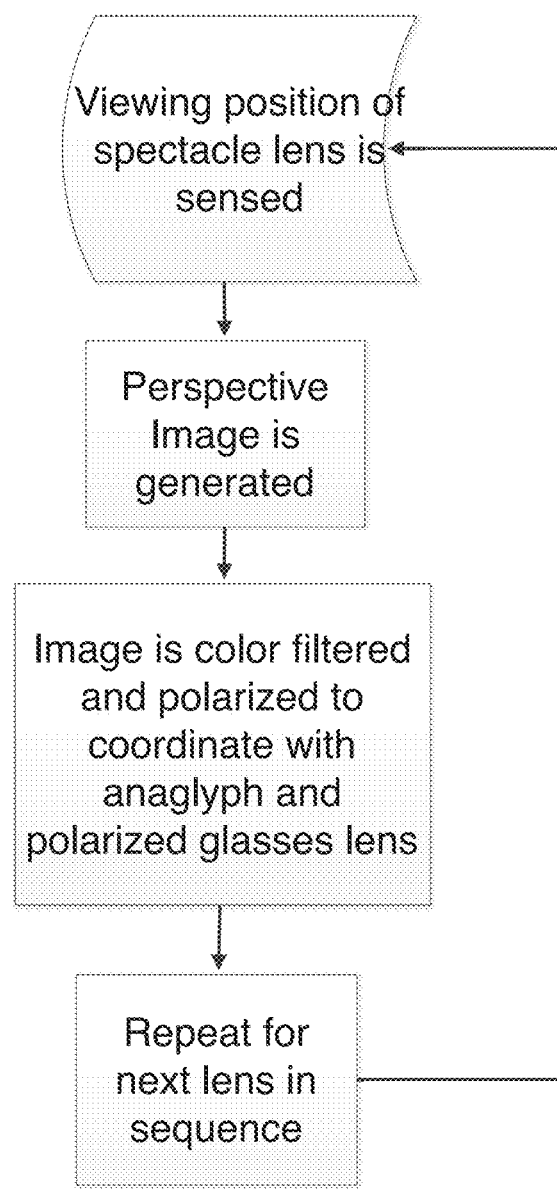
FIG. 9A is a schematic diagram illustrating an embodiment applying viewpoint sensors and passively polarized anaglyph glasses.

With reference now to FIGS. 9 and 9A of the drawings, a flow diagram of an embodiment the instant invention is presented which shows two methods for creating 3D stereoscopic images which are seen from different perspectives while the 3D stereoscopic object is seen in the same location in space. A first method (A) employs anaglyph glasses. A second method (B) employs passively polarized glasses. A third method (C) employs passively polarized anaglyph glasses. However this is not intended to limit the device to these methods, and any method that produces the same results may be used.

One means to accomplish this is for the sensors to track an object, use facial recognition. Magnetic, acceleration, and gravitational data may also be employed to determine the first and second viewpoints. The viewpoints correspond to the positions of first or left and second or right eye.

The other methods for locating these viewpoint locations include but are not limited to markers that may reflect or transmit light and or sound, or create a magnetic field. These markers may be located on the face, body or on a wearable object. The methods given to recognize and locate a pair of eyes, glasses or facial feature viewpoints is for illustrative purposes only and is not meant to be limiting in any way.

Figure 10:
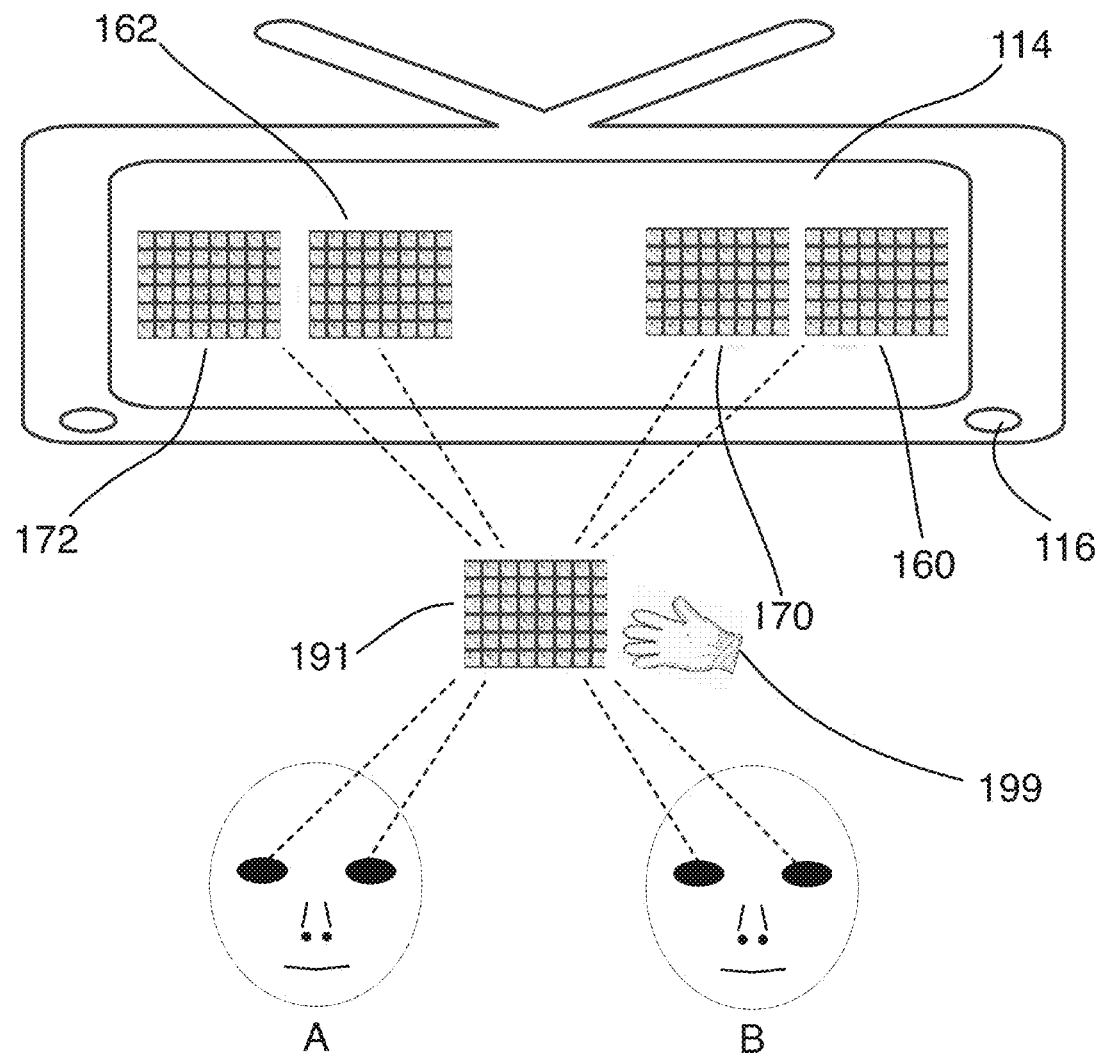
FIG. 10 is a schematic diagram illustrating an embodiment applying position sensors and illustrating user interaction with the virtual image.

With reference now to FIG. 10 of the drawings, there is shown an illustration of an embodiment of the instant invention. In this illustration a 3D stereoscopic image of a keyboard is shown. The virtual image of the keyboard in space is approximately the same for most viewing locations. Therefore, the virtual location in space of each individual key on the keyboard may be calculated. In this manner a flat image may be projected in the 3D stereoscopic real world to create a virtual touch screen. This virtual display may be interacted with based on proximity sensing in much the same way a 2D touch screen would. Additional visual or aural enhancements would allow the user to know when his proximity triggers a response. For example a ripple pattern as is often seen on the surface of the water would alert the user his touch is in proximity to a location on the 3D stereoscopic image. In this embodiment, either the method applying anaglyph glasses, passively polarized glasses, or passively polarized anaglyph glasses may be used.

In addition, we may use tracking methods to locate a pointer, body part, or wearable device. Their position in space may likewise be calculated or quantified. A wearable device such as a glove may contain position markers of reflective or emissive materials which enable sensors to accurately determine it's location in space and for the case of a glove also the fingers. Advanced sensors may be able to detect the location of fingers without the need for gloves with position markers. In this embodiment, the methods applying anaglyph glasses, passively polarized glasses or passively polarized anaglyph glasses may be used.

As the location of the 3D stereoscopic keyboard and also a pointer or pointers location is known, it may now be possible through computation to determine when the body part or pointer is in proximity to places on the keyboard. In this manner keyboard entries may be made. This is similar to what occurs on a 2D screen with touch sensing. The difference being the typing takes place on a virtual image as opposed to a solid surface. Most methods of interacting with a 2D touch screen may be applied to the 3D virtual image. The user does not have to be within reaching distance of the 2D display in order to interact with the stereoscopic virtual image. In this embodiment, either the method applying anaglyph glasses, or the method applying passively polarized glasses may be used. The method applying passively polarized anaglyph glasses may also be used.

The virtual keyboard and any other virtual object may be interacted in a multitude of other ways. These include stretching and shrinking, twisting and turning and any other ways a 2D touch object could be manipulated. These descriptions of 3D object image manipulations are illustrative only and are not intended to be limiting in any way. The understanding is that for the 3D virtual touch object, 3 axis rather than 2 axis, may be applied and manipulated. In this embodiment, either the method applying anaglyph glasses, or the method applying passively polarized glasses may be used. The method applying passively polarized anaglyph glasses may also be used.

In addition, the virtual keyboard or any other virtual interactive device described below may be brought forth and/or removed by user gestures sensed by the systems location sensors. In addition gestures sensed by the location sensors may be used for other functions, such as but not limited to turning the pages of an electronic book, changing stations on a television, or raising or lowering volume of the display system or other components. The interactive control devices may be brought forth by gesture, voice commands, a combination of the two or by other means.

Figure 11:
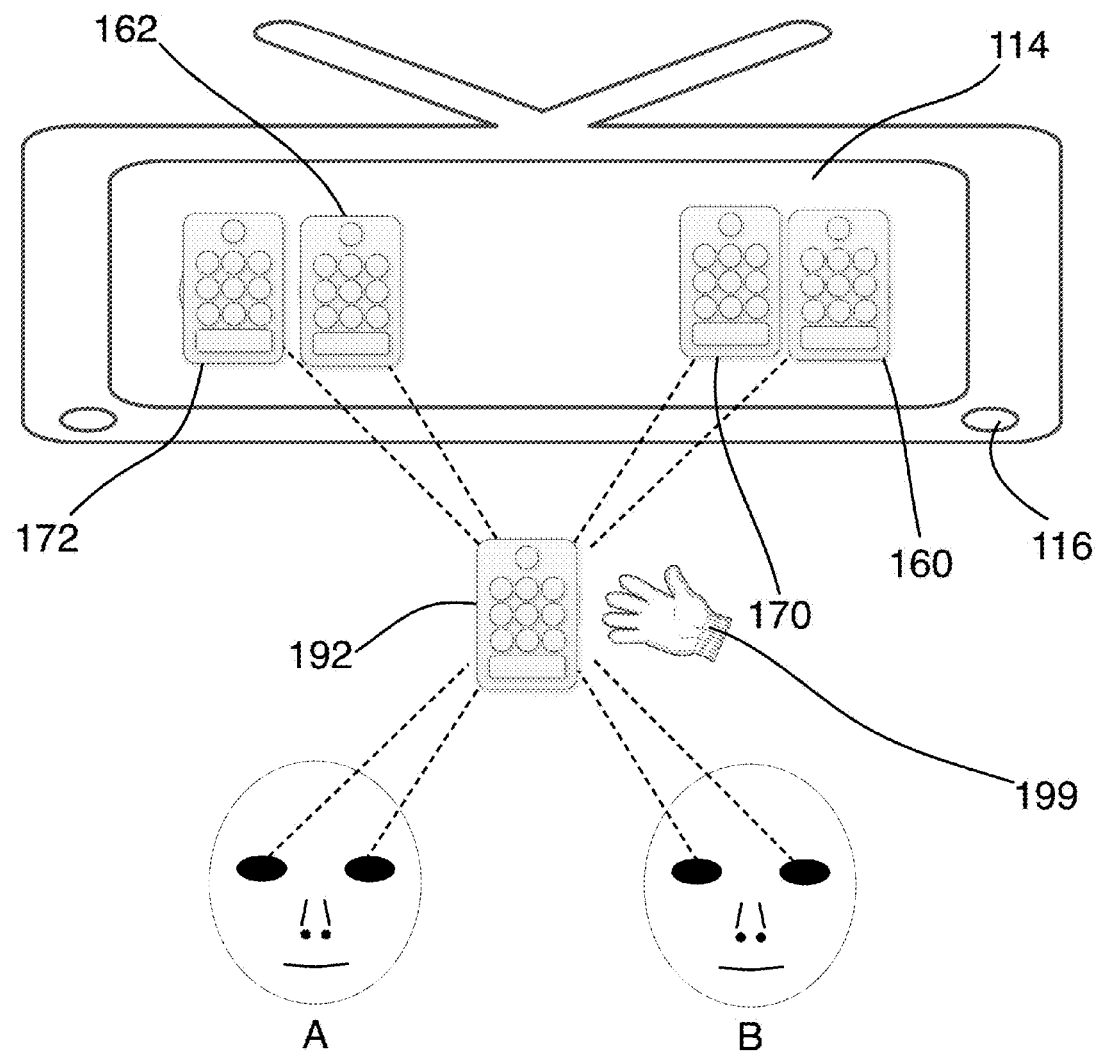
FIG. 11 is a schematic diagram illustrating an embodiment applying position sensors and illustrating user interaction with the virtual image.

With reference now to FIG. 11 of the drawings, there is shown an illustration of an embodiment of the instant invention. In this illustration a 3D stereoscopic image of a remote controller is shown. In addition, the remote controller may be applied to control objects outside the device. This may be accomplished by applying wifi, Bluetooth or other wireless means. In addition by applying the internet items at a large distance from the display may be controlled. In this embodiment, either the method applying anaglyph glasses, or the method applying passively polarized glasses may be used. The method applying passively polarized anaglyph glasses may also be used. All of the properties described in association with illustration 10 may apply.

Figure 12:
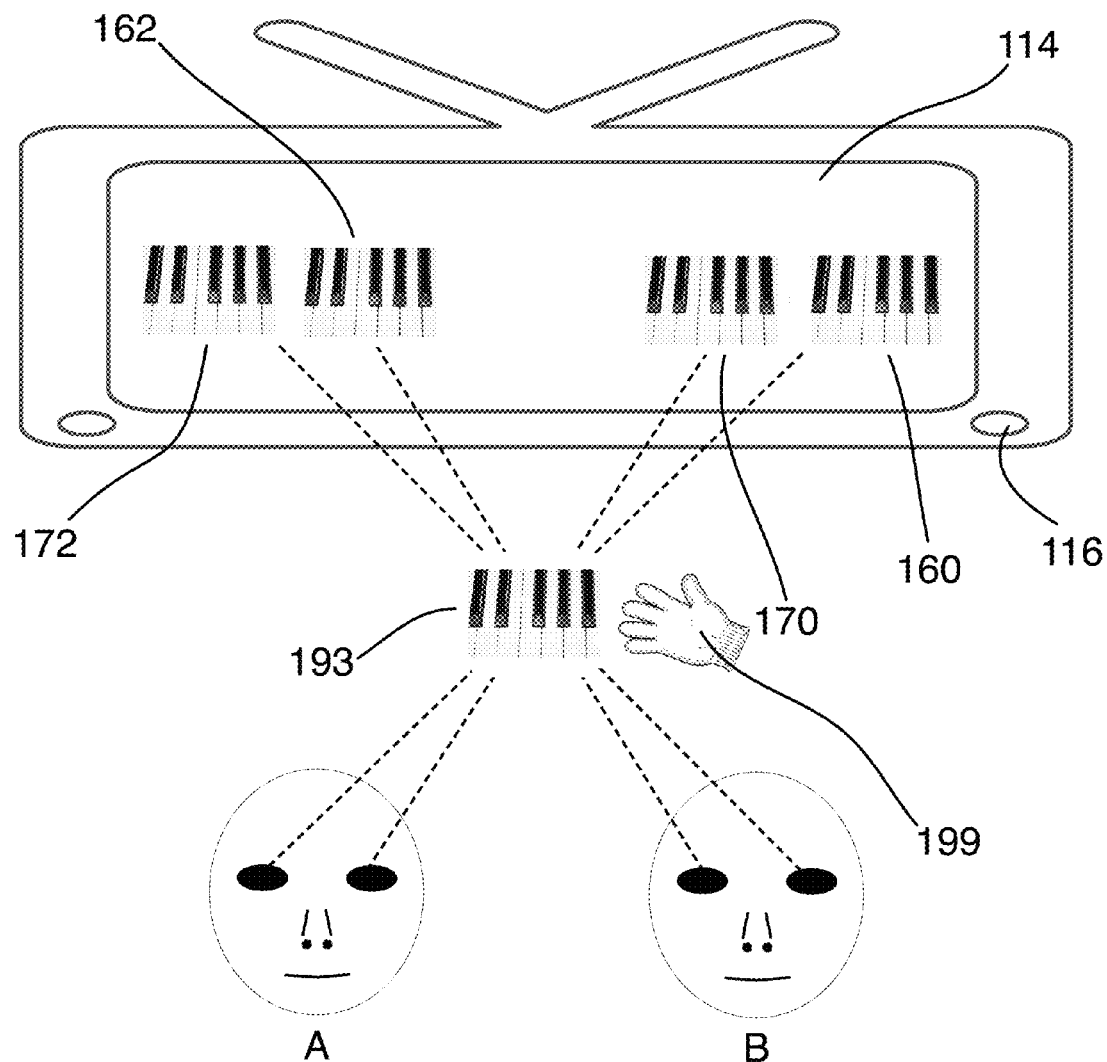
FIG. 12 is a schematic diagram illustrating an embodiment applying position sensors and illustrating user interaction with the virtual image.

With reference now to FIG. 12 of the drawings, there is shown an illustration of an embodiment of the instant invention. In this illustration a 3D stereoscopic image of a keyboard is shown. Placing, touching, pressing, or otherwise gesturing at the keyboard may through a computer interface produce sound or music. The virtual keyboard shown is for illustrative purposes and is not intended to be limiting. Other virtual musical instruments include, but are not limited to drums, percussion instruments, wind wood instruments, etc. In this embodiment, either the method applying anaglyph glasses, or the method applying passively polarized glasses may be used. The method applying passively polarized anaglyph glasses may also be used. All of the properties described in association illustration 10 may apply.

Figure 13:
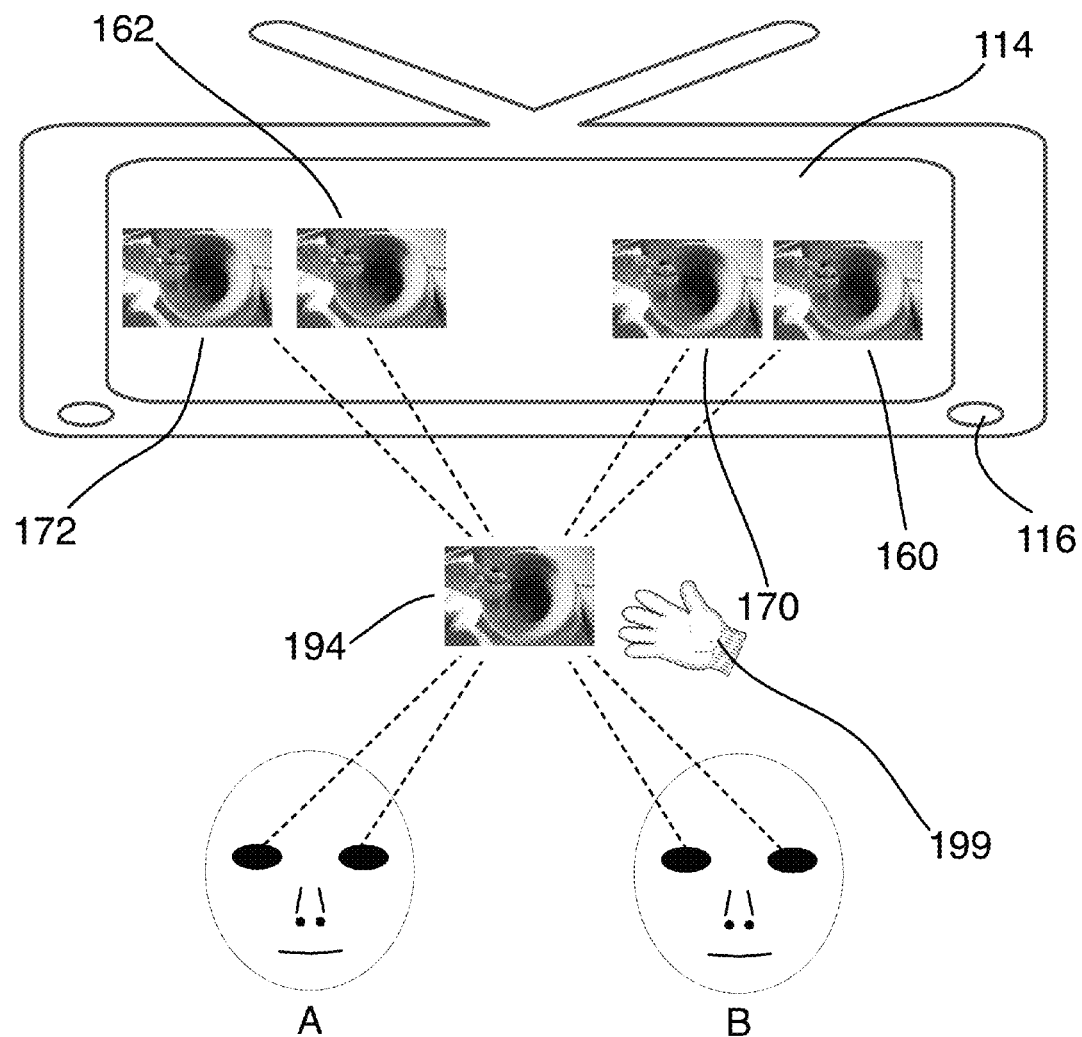
FIG. 13 is a schematic diagram illustrating an embodiment applying position sensors and illustrating user interaction with the virtual image.

With reference now to FIG. 13 of the drawings, there is shown an illustration of an embodiment of the instant invention. In this illustration a 3D stereoscopic image of a pottery wheel is shown. Such a virtual image may be made to rotate and a virtual pottery creation may be created. The image may be manipulated by the user and saved for 3D printing or other uses. In like manner other objects may be created which do not require a rotational motion. In this embodiment, either the method applying anaglyph glasses, or the method applying passively polarized glasses may be used. The method applying passively polarized anaglyph glasses may also be used. All of the properties described in association with illustration 10 may apply.

Figure 14:
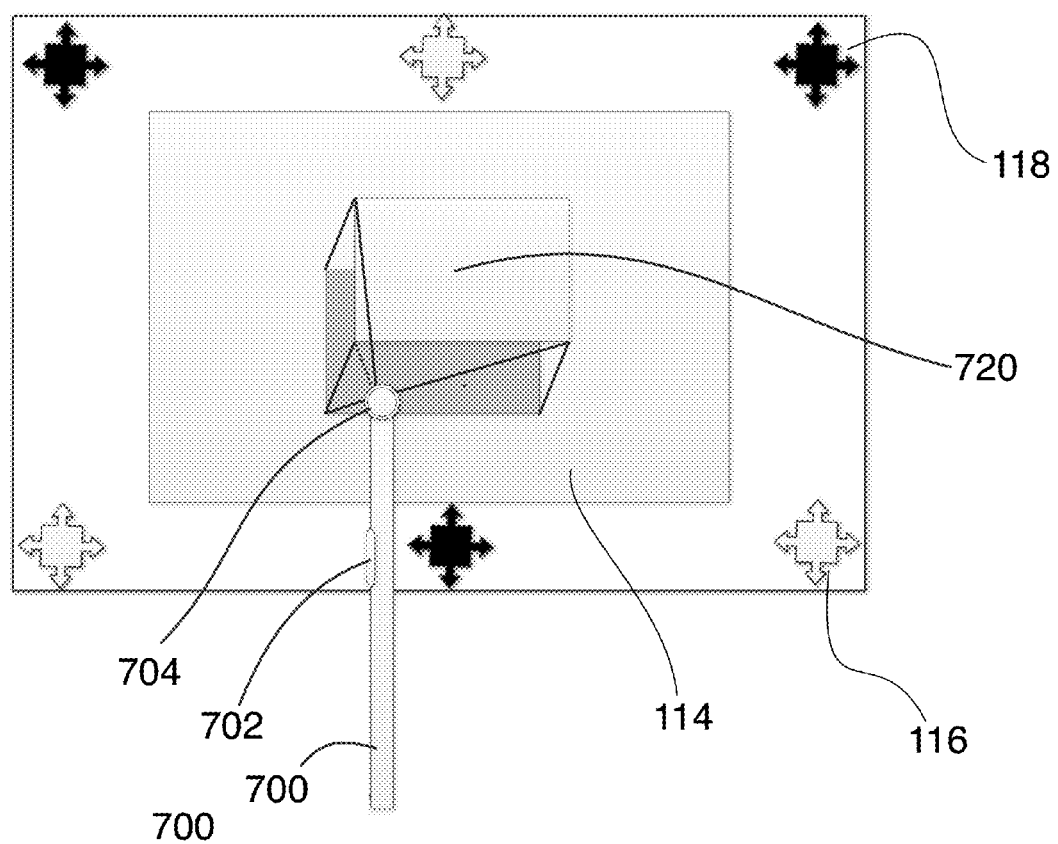
FIG. 14 is a schematic diagram illustrating an embodiment applying position sensors and illustrating user interaction with the virtual image.

With reference now to FIG. 14 of the drawings, there is shown an illustration of an embodiment of the instant invention. In this illustration a 3D stereoscopic image of a box is shown. The box is manipulated by use of a pointing tool (item 700). This pointing tool may have a tip (item 704) of emissive material, reflective material or other means to make it's location easily read by the sensors. The pointer may also have one or more functional buttons (item 702). These buttons may operate in a similar fashion as buttons on a computer controller such as a mouse. By applying this pointer an object may be identified, grabbed and moved, sized or any number of functions commonly associated with the computer mouse. The difference being that the virtual objects and the pointer may be operated in 3 axis or dimensions. In this embodiment, either the method applying anaglyph glasses, or the method applying passively polarized glasses may be used. The method applying passively polarized anaglyph glasses may also be used. All of the properties described in association with illustration 10 may apply.

Figure 15:
FIG. 15 is a schematic diagram illustrating an embodiment applying position sensors and illustrating a virtual cave.

With reference now to FIG. 15 of the drawings, there is shown an illustration of an embodiment of the instant invention. In this illustration a 3D stereoscopic virtual cave is shown which employs the technology previously illustrated. In such a cave the objects appear more real as they remain approximately fixed in space as the viewer and viewpoint location are changed. The objects in the virtual cave may be interacted with in the manner which has been described above. In this embodiment, either the method applying anaglyph glasses, or the method applying passively polarized glasses may be used. The method applying passively polarized anaglyph glasses may also be used. All of the properties described in association with illustration 10 may apply.

Figure 16:
FIG. 16 is a schematic diagram illustrating an embodiment applying position sensors and illustrating a virtual simulator.

With reference now to FIG. 16 of the drawings, there is shown an illustration of an embodiment of the instant invention. In this illustration a 3D stereoscopic image of an aircraft simulator is shown. Varying amounts of the simulator may be simulated depending on the wants of the user. It may be that only objects outside of the control environment are simulated. However it is possible for virtual controls, buttons, switches and other controlling devices to be simulated and interacted with, in the manner described above. In addition the interior environment of the simulator may be created virtually. This enables simulators whose configuration may be controlled by applying computer software. For example a virtual flight simulator could be used as a Boeing 737 for one event and reconfigured as an Airbus 320 for the next event. This would save money for the user as fewer simulators would be needed. Other virtual simulations lend application to, but are not limited to, law enforcement and the military. In this embodiment, either the method applying anaglyph glasses, or the method applying passively polarized glasses may be used. The method applying passively polarized anaglyph glasses may also be used. All of the properties described in association with illustration 10 may apply.

Figure 17:
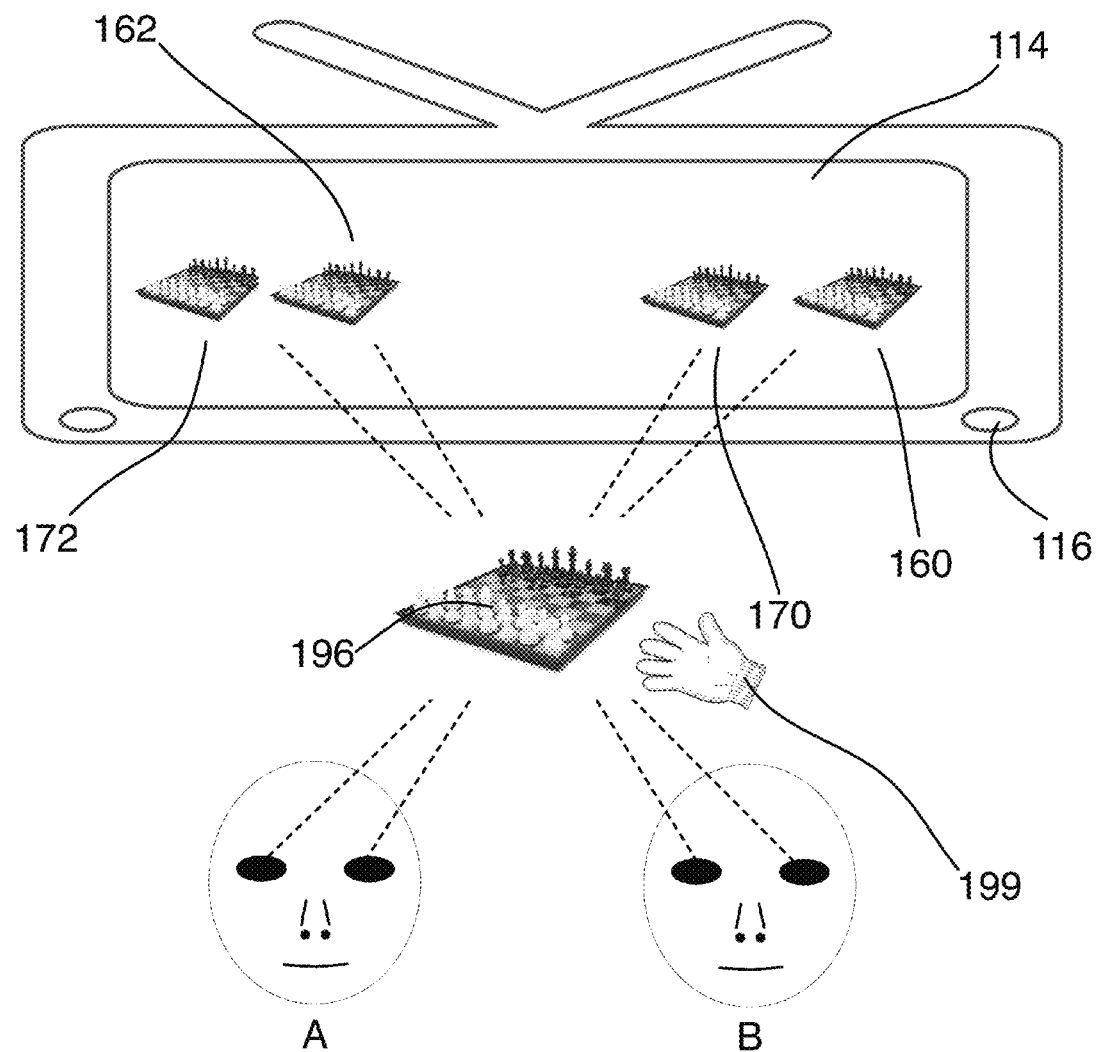
FIG. 17 is a schematic diagram illustrating an embodiment applying position sensors and illustrating a virtual gaming system.

With reference now to FIG. 17 of the drawings, there is shown an illustration of an embodiment of the instant invention. In this illustration a 3D stereoscopic image of a game (item 196) is shown. The 3D virtual game pieces may be created and also manipulated by any of the methods previously described. All of the properties described in illustration 29 apply. The display system (item 114) may be made to lay flat so as to provide a better gaming surface. In this way board games and other types of games may be played and interacted with by the user or users. Virtual worlds may be created, viewed and/or interacted with. This embodiment of the instant invention makes an excellent gaming system. In this embodiment, either the method applying anaglyph glasses, or the method applying passively polarized glasses may be used. The method applying passively polarized anaglyph glasses may also be used. The method of passively polarized anaglyph glasses is of good use for games such as scrabble or poker, where one player hides information from the other. All of the properties described in association with illustration 10 may apply.

Using passively polarized anaglyph glasses would allow two viewers to view real world 3D stereoscopic images that differ in content. The content could be individualized in such a manner so a player may view a real world stereoscopic image that the other player could not view. This would be especially useful in gaming simulations, but is not intended to be limited to this use. For example it could also be useful in two person simulators where each viewer would have a different perspective.

Figure 18:
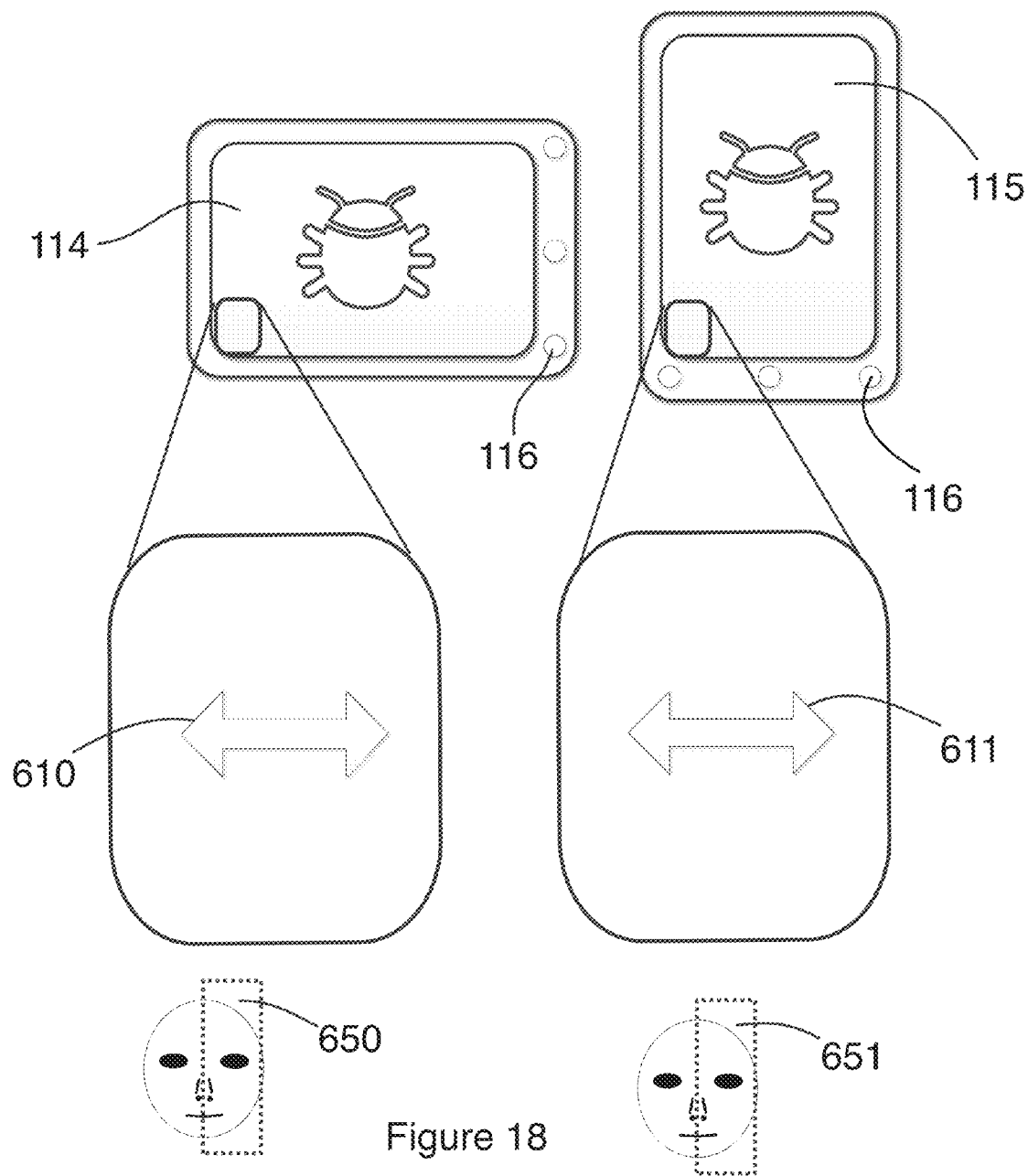
FIG. 18 is a schematic diagram illustrating an embodiment viewable in portrait or landscape modes.

With reference now to FIG. 18 of the drawings, there is shown an illustration of an embodiment of the instant invention. In this illustration, a handheld device is shown which may be used in both portrait and landscape modes. The method of anaglyph glasses or passively polarized glasses may be applied. The method applying passively polarized anaglyph glasses may also be used.

Figure 19:
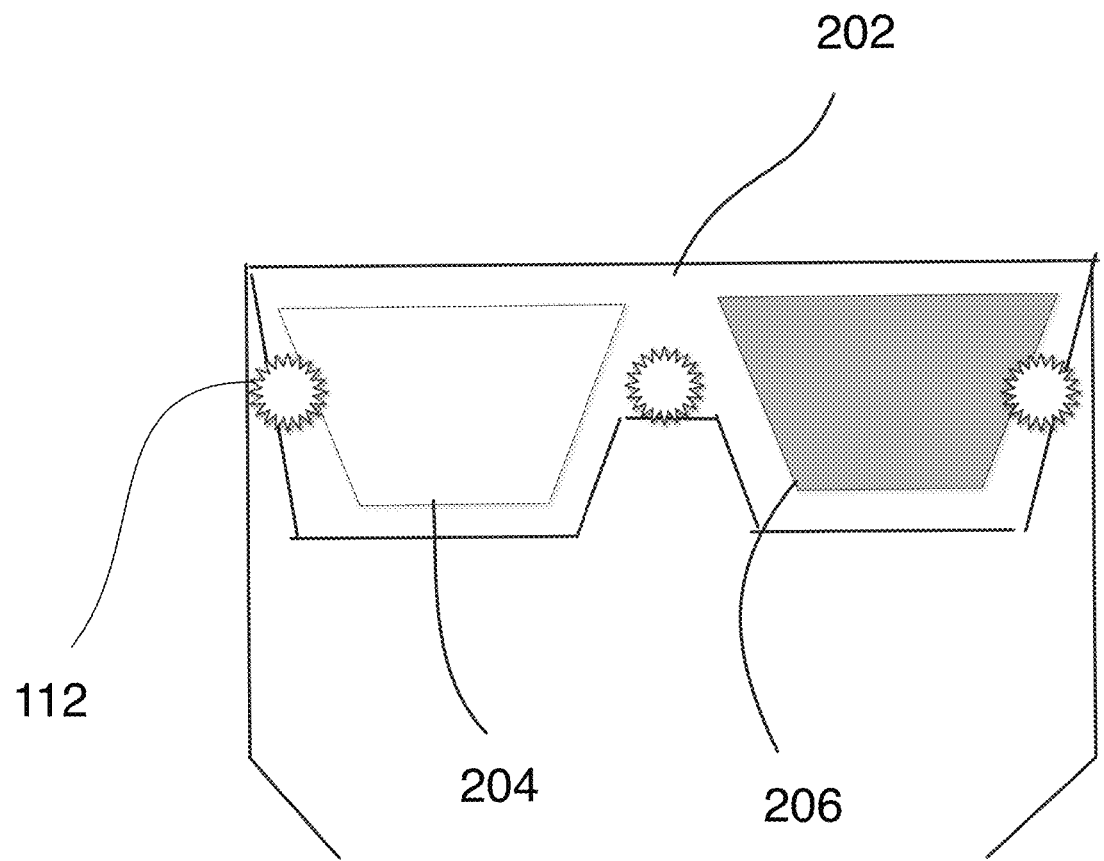
FIG. 19 is a schematic diagram illustrating an embodiment of anaglyph glasses.

With reference now to FIG. 19 of the drawings, there is shown an illustration of anaglyph glasses. A first lens (item 204) allows light of a different color to pass than that of a second lens (item 206).

Figure 20:
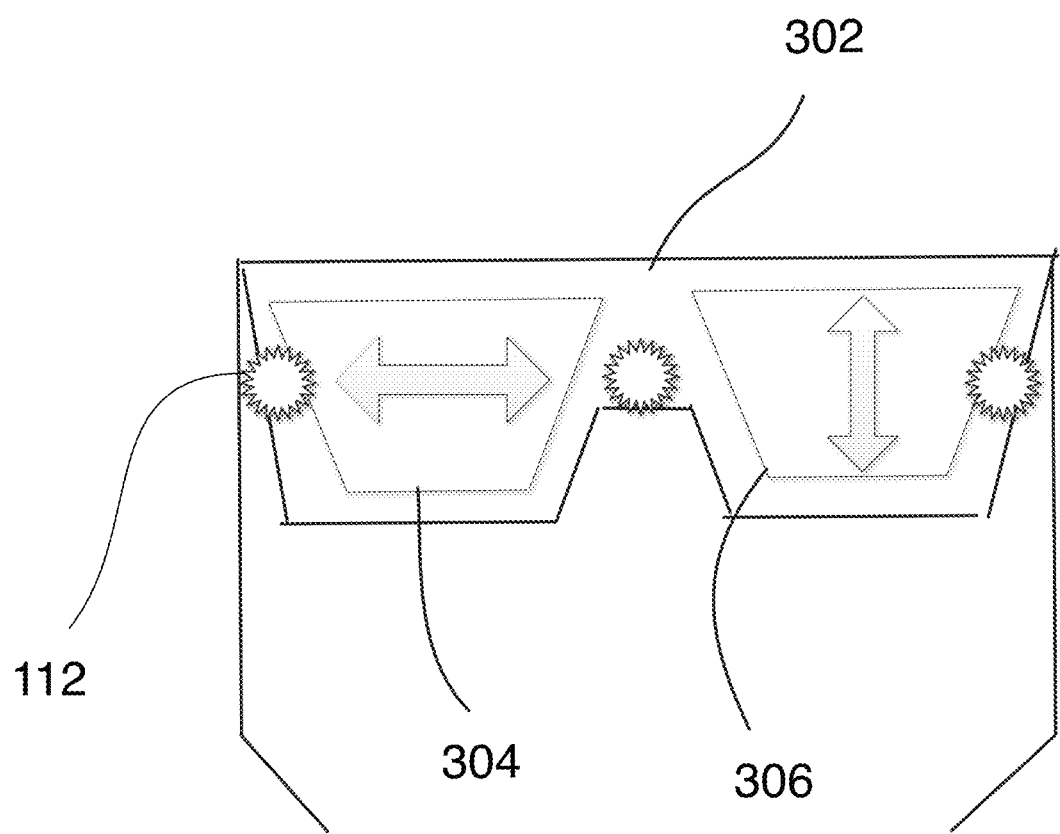
FIG. 20 is a schematic diagram illustrating an embodiment of passively polarized glasses.

With reference now to FIG. 20 of the drawings, there is shown an illustration of passively polarized glasses. A first lens (item 304) allows light of an opposing polarization direction to pass than that of a second lens (item 306). The polarization may be linear, circular, or elliptical.

Figure 21:
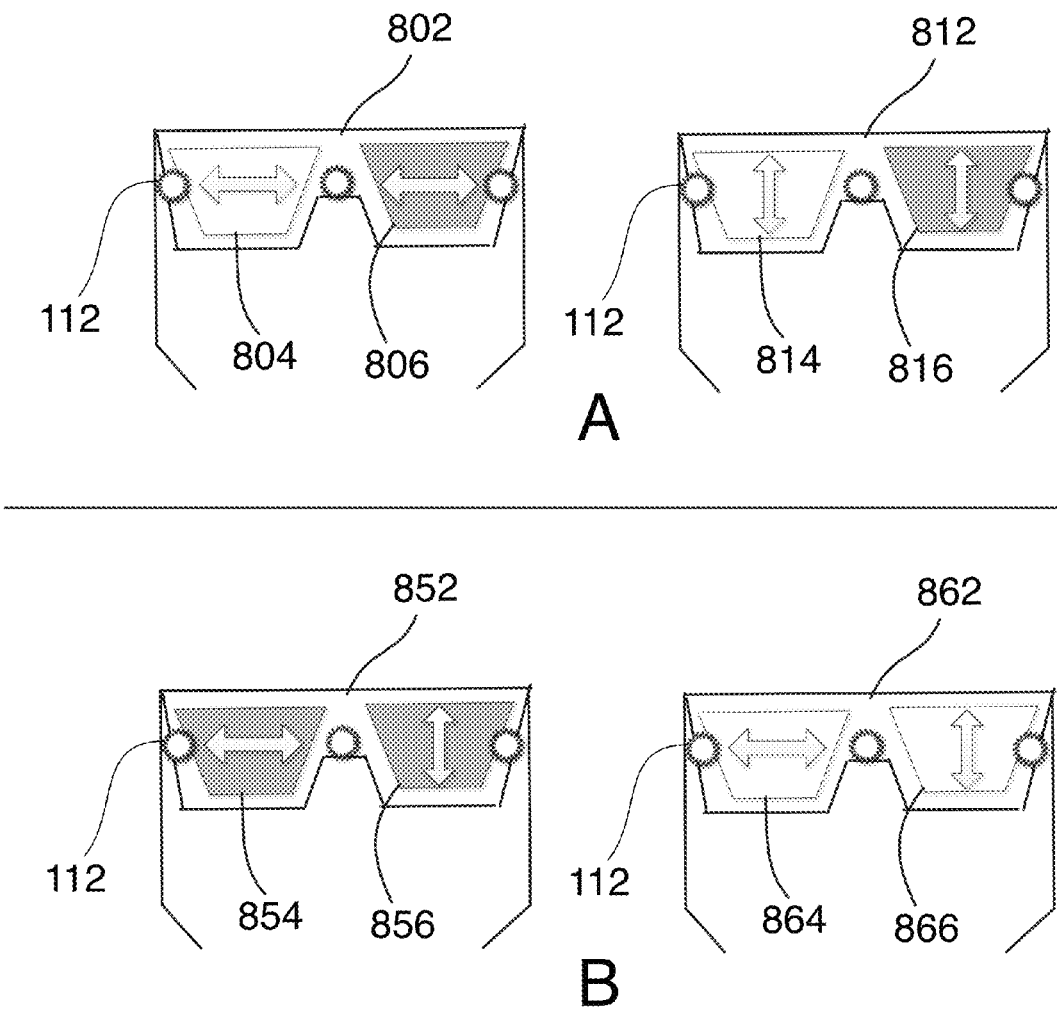
FIG. 21 is a schematic diagram illustrating an embodiment of passively polarized anaglyph glasses.

With reference now to FIG. 21 of the drawings, there is shown an illustration of passively polarized anaglyph glasses. In illustration A the planes of polarization in is the same for both lenses of a pair of glasses, while the color of the lenses is different. Between glasses 802 and 812 the polarization orientation is different. The polarization may be linear, circular, or elliptical. In illustration B the polarization pattern is in opposition between lenses of the same pair of glasses. The color in the first and second lens of the glasses is the same. However the colors of one pair of glasses (item 852) differs from the colors of the second pair of glasses (item 862). These would allow two users to interact with different images. Examples would be a game of scrabble or poker. However these examples are not intended to limit the use of this device in any way.

Furthermore, the instant invention may be switched to other modes of operation. These include but are not limited to prior art 3D stereoscopic imaging where the 3D stereoscopic image location varies with viewer location. This may be a useful mode for viewing prior art technology 3D imagery such as 3D movies. Also, the display may be used to view 2D images in the manner of prior art. The switching among the various 3D and 2D modes may be automatic based on the format of the viewing material.

Furthermore, although exemplary embodiments have been disclosed herein, and although specific terms are employed, they are used and are to be interpreted in a generic and descriptive sense only, and not for purpose of limitation. Accordingly, it will be understood by those of ordinary skill in the art that various changes in form and details may be made without departing from the spirit and scope of the instant invention as set forth in the claims.

By way of conclusion, the prior art in this area of technology is limited by viewing location. In addition the prior art is limited to 3D stereoscopic images that may not be seen in approximately the same location as viewpoint changes nor when viewed by different users. This does not allow users to communicate about a 3D stereoscopic image by gestures, for example pointing, or gesturing. In the instant invention the user(s) may also interact with 3D stereoscopic images or virtual images. Applying location-sensing technology and comparing position data with the computed 3D virtual object location accomplish this.

In addition, a 3D stereoscopic image may be created which remains approximately fixed in space. One or more viewers may point at such a virtual image. Because the virtual image is nearly fixed in space it's virtual location may be compared with a user's finger, other body parts or pointer. In this way a viewer may interact with a virtual 3D image by pointing or other gestures as sensed by the position sensors. In addition the position sensors may be used to interpret a variety of gestures that correspond to a variety of commands. By using the position sensors gestures may be made which cause the display device to react to the viewer. Examples include but are not limited to gestures that call for a virtual keyboard or remote to be displayed. They may also cause a station of a television to change or the volume to increase or decrease. They may be used to control other devices as well via wired or wireless means. There are many more possibilities and this list of gestures and results is not intended to be limiting in any way.

These and other advantages are readily apparent to one who has viewed the accompanying figures and read the descriptions.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the instant invention as set forth in the following claims.

While the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

I claim:

1. A stereoscopic image display device comprising:
   at least one sensor configured to track the positions of two pairs of eyewear based on perspective locations of lenses of the two pairs of eyewear to a physical object in relation to the stereoscopic image display device, wherein the two pairs of eyewear are physical objects that are each associated with a user of two users;
   a processor configured to map coordinates of a three-dimensional (3D) virtual object generated by the stereoscopic image display device, wherein the 3D virtual object comprises a location observable by the lenses in the eyewear relative to the physical object; and,
   an image generator configured to create two respective pairs of first and second stereoscopic images of the 3D virtual object displayed to respective eyes of the two users of the stereoscopic display device at the location, wherein the first and second stereoscopic images for each user are based upon viewpoint perspectives of an angle and distance of the perspective locations of the lenses of the 3D virtual object to each user,
   wherein a sensor of the at least one sensor tracks a hand, a finger or a pointer such that the physical object interacts with the 3D virtual object when detected and is brought near the location of the 3D virtual object as shown by each pair of first and second stereoscopic images, such that each pair of first and second stereoscopic images are updated based on the interaction with the 3D virtual object and the angle and distance of the perspective locations of the lenses.

2. A stereoscopic image display device comprising:
   at least one sensor configured to track positions of eyes of viewers of the stereoscopic image display device, based on object recognition, in relation to the stereoscopic image display device;
   a processor configured to map coordinates of a three-dimensional (3D) virtual object generated by the stereoscopic image display device, wherein the 3D virtual object comprises a location in a physical space in front of and relative to the stereoscopic image display device;
   an image generator configured to create respective pairs of first and second stereoscopic images of the 3D virtual object displayed to the eyes of each viewer of the stereoscopic image display device such that the 3D virtual object is seen by each viewer in a same physical location, wherein the first and the second stereoscopic images for each viewer are based upon viewpoint perspectives of an angle and distance of a perspective location of the eyes of each viewer as detected by the at least one sensor; and, lenses of glasses that use both color discriminating filters and polarization discriminating filters, wherein the first and second stereoscopic images are directed to left and right eyes respectively of each viewer;

wherein the 3D virtual object is viewable by a plurality of viewers, as shown by the respective first and the second stereoscopic images created for each respective viewer, and wherein a hand, a finger, or a pointer interacts with the 3D virtual object when detected near the location of the 3D virtual object as shown by the first and the second stereoscopic images for each viewer, such that the first and the second stereoscopic images are updated for each viewer based on the interaction with the 3D virtual object and the angle and distance of the perspective locations of the eyes of the respective viewer.

3. The system of claim 2 wherein the at least one sensor is further configured to apply one or more of object recognition, facial recognition technology, gyroscopic, acceleration sensing, gravitational sensing and magnetic fields to track objects.

4. The system of claim 2 wherein the lenses of the glasses are made of a color discriminating material which allows light with correct color characteristics to pass with stereo coordination to the eyes of each viewer.

5. The system of claim 2 wherein the lenses of the glasses are made of a polarization discriminating material which allows light with correct polarization characteristics to pass with stereo coordination to the eyes of each viewer.

6. A stereoscopic image display device configured to control another external device, the stereoscopic image display device comprising:

at least one sensor configured to track positions of eyes of viewers of the stereoscopic image display device, based on object recognition, in relation to the stereoscopic image display device;

a processor configured to map coordinates of a three-dimensional (3D) virtual object generated by the stereoscopic image display device, wherein the 3D virtual object comprises a location in a physical space in front of and relative to the stereoscopic image display device; and, an image generator configured to create respective pairs of first and second stereoscopic images of the 3D virtual object displayed to the eyes of each viewer of the stereoscopic display device such that the 3D virtual object is seen by each viewer in a same physical location, wherein the first and the second stereoscopic images for each viewer are based upon viewpoint perspectives of an angle and distance of a perspective location of the eyes of each viewer as detected by the at least one sensor; and, wherein a hand, a finger, or a pointer interacts with the 3D virtual object when detected near the location of the 3D virtual object as shown by the first and the second stereoscopic images for each viewer, such that the first and the second stereoscopic images for each viewer are updated based on the interaction with the 3D virtual object and the angle and distance of the perspective locations of the eyes of the respective viewers, wherein a signal is sent to control an external device when the hand, the finger, or the pointer is detected near the location of the 3D virtual object.

7. The system of claim 6 wherein the at least one sensor is further configured to apply one or more of object recognition, facial recognition technology, gyroscopic, acceleration sensing, gravitational sensing and magnetic fields to track objects.

* * * * *